(12) United States Patent
Kim

(10) Patent No.: US 8,510,678 B2
(45) Date of Patent: Aug. 13, 2013

(54) CONTENT CONTROL APPARATUS AND METHOD THEREOF

(75) Inventor: Nari Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 255 days.

(21) Appl. No.: 12/878,890

(22) Filed: Sep. 9, 2010

(65) Prior Publication Data

US 2011/0225549 A1 Sep. 15, 2011

(30) Foreign Application Priority Data

Mar. 12, 2010 (KR) .......................... 10-2010-0022452

(51) Int. Cl.
*G06F 3/048* (2006.01)

(52) U.S. Cl.
USPC .......................................................... 715/838

(58) Field of Classification Search
USPC .......................................................... 715/838
See application file for complete search history.

(56) References Cited

U.S. PATENT DOCUMENTS

| | | | | |
|---|---|---|---|---|
| 5,684,970 A | * | 11/1997 | Asuma et al. | 715/775 |
| 7,805,681 B2 | * | 9/2010 | Hansson et al. | 715/751 |
| 2002/0075324 A1 | | 6/2002 | Combs et al. | |
| 2005/0066292 A1 | | 3/2005 | Harrington | |
| 2010/0041442 A1 | * | 2/2010 | Hong | 455/566 |
| 2011/0010667 A1 | * | 1/2011 | Sakai et al. | 715/810 |

FOREIGN PATENT DOCUMENTS

| | | |
|---|---|---|
| KR | 10-2003-0075086 A | 9/2003 |
| KR | 10-2006-0042065 A | 5/2006 |

* cited by examiner

*Primary Examiner* — Stephen Hong
*Assistant Examiner* — James G Pohlman
(74) *Attorney, Agent, or Firm* — Birch, Stewart, Kolasch & Birch, LLP

(57) ABSTRACT

A content control apparatus and method thereof in which an icon indicating a category of an application program displayed on a representative image of the application program is discussed. A content control apparatus according to embodiments of the present invention may include a controller configured to determine a category of an application program and an image representing the application program, and to determine an icon corresponding to the determined category of the application program; and a display unit including a screen, and configured to simultaneously display the image representing the application program and the icon corresponding to the determined category of the application program on the screen.

26 Claims, 17 Drawing Sheets

CONTENT CONTROL APPARATUS AND METHOD THEREOF

CROSS-REFERENCE TO A RELATED APPLICATION

Pursuant to 35 U.S.C. §119(a), this application claims the benefit of earlier filing date and right of priority to Korean Application No. 10-2010-0022452 filed on Mar. 12, 2010, the contents of which are incorporated by reference herein in its entirety.

BACKGROUND OF THE INVENTION

1. Field of the Invention

The present invention relates to a content control apparatus and method thereof.

2. Background of the Invention

In general, a content control apparatus controls various contents such as video, photo, and map data according to an input signal received by a user.

SUMMARY OF THE INVENTION

A content control apparatus according to the present invention may include a controller configured to detect a category and a representative image of an application program from the application program when the application program is generated, and generate a preset icon matching the detected category; and a display unit configured to display the representative image and the generated icon on a screen.

As an example associated with the present invention, the icon may be an icon indicating a category of the application program.

As an example associated with the present invention, the icon may further include a text corresponding to the category.

As an example associated with the present invention, the representative image may be an icon indicating the application program.

As an example associated with the present invention, the controller may display the representative image and the generated icon on a background screen of the display unit.

As an example associated with the present invention, the preset icon matching the detected category may be any one of a figure, a symbol, a figure having a color, an outline to be displayed on the outside of the representative image, an outline having a color to be displayed on an outside of the representative image, and a translucent color to be overlapped with the representative image.

As an example associated with the present invention, the controller may display the preset icon matching the category on the representative image.

As an example associated with the present invention, the controller may place the preset icon matching the category within the representative image or at an outer side of the representative image.

As an example associated with the present invention, the controller may display a preset icon matching a plurality of categories on the representative image when the application program includes the plurality of categories, wherein the icon displayed on the representative image of the application program is displayed differently from one another according to the category.

As an example associated with the present invention, the controller may detect representative images having the same icon as the selected icon when the icon displayed on the representative image is selected, and the detected representative images may be arranged in a preset direction to display on the display unit.

As an example associated with the present invention, the controller may randomly display the arranged and displayed representative image on the display unit when a first icon of a first representative image is selected among the representative images arranged in a preset direction and displayed on the display unit.

As an example associated with the present invention, the controller may count the execution number of the application program, and set the application program to an important application program when the counted execution number is equal to or greater than a preset number.

As an example associated with the present invention, the controller may generate a preset icon matching a representative image of the important application program, and display the generated icon together with the representative image of the important application program on the display unit, wherein the preset icon matching a representative image of the important application program and the preset icon matching a representative image of the application program are different from each other.

As an example associated with the present invention, the controller may display a representative image of the important application program together with a preset icon matching the representative image on the display unit when a key for checking the important application program is selected.

As an example associated with the present invention, the controller may detect a category of the application program based on category information included in the attribute information of the application program or an extension of the application program.

As an example associated with the present invention, the controller may display a category setting menu on the display unit when an icon for setting a category is selected, wherein the category setting menu includes icons and category names according to the category.

As an example associated with the present invention, the controller may display the generated icon on the representative image, and display information of the application program on the display unit when the icon is selected.

As an example associated with the present invention, the controller may display the moved icon as an icon indicating a category of the application program corresponding to the different representative image when the icon displayed on the representative image is moved to a representative image different from the representative image.

As an example associated with the present invention, the controller may change an icon indicating a category of the application program corresponding to the different representative image to the moved icon when the icon displayed on the representative image is moved to a representative image different from the representative image.

As an example associated with the present invention, the controller may display a menu for setting the moved icon on the display unit when the icon displayed on the representative image is moved to a representative image different from the representative image.

As an example associated with the present invention, the controller may randomly move the icon or consecutively move along a preset trace within a representative image of the application program.

As an example associated with the present invention, the controller may fix the icon to the representative image when the representative image or the icon is selected.

As an example associated with the present invention, the controller may display an icon indicating a category on a photo corresponding to each contact information, and display a contact address matching the selected icon on the display unit when the icon is selected.

A content control apparatus according to the present invention may include a controller configured to determine a category of an application program and an image representing the application program, and to determine an icon corresponding to the determined category of the application program, and a display unit including a screen, and configured to simultaneously display the image representing the application program and the icon corresponding to the determined category of the application program on the screen.

A content control method according to the present invention may include determining, by the mobile terminal, a category of an application program and an image representing the application program, determining, by the mobile terminal, an icon corresponding to the determined category of the application program, and displaying simultaneously, on a screen of the display unit, the image representing the application program and the icon corresponding to the determined category of the application program.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, preferred embodiments of a content control apparatus and method thereof, in which an icon indicating a category of an application program (content) is displayed on a representative image of the application program to allow a user to easily and quickly retrieve content such as an application program, will be described in detail with reference to FIGS. 1 through 23.

Figure 1:
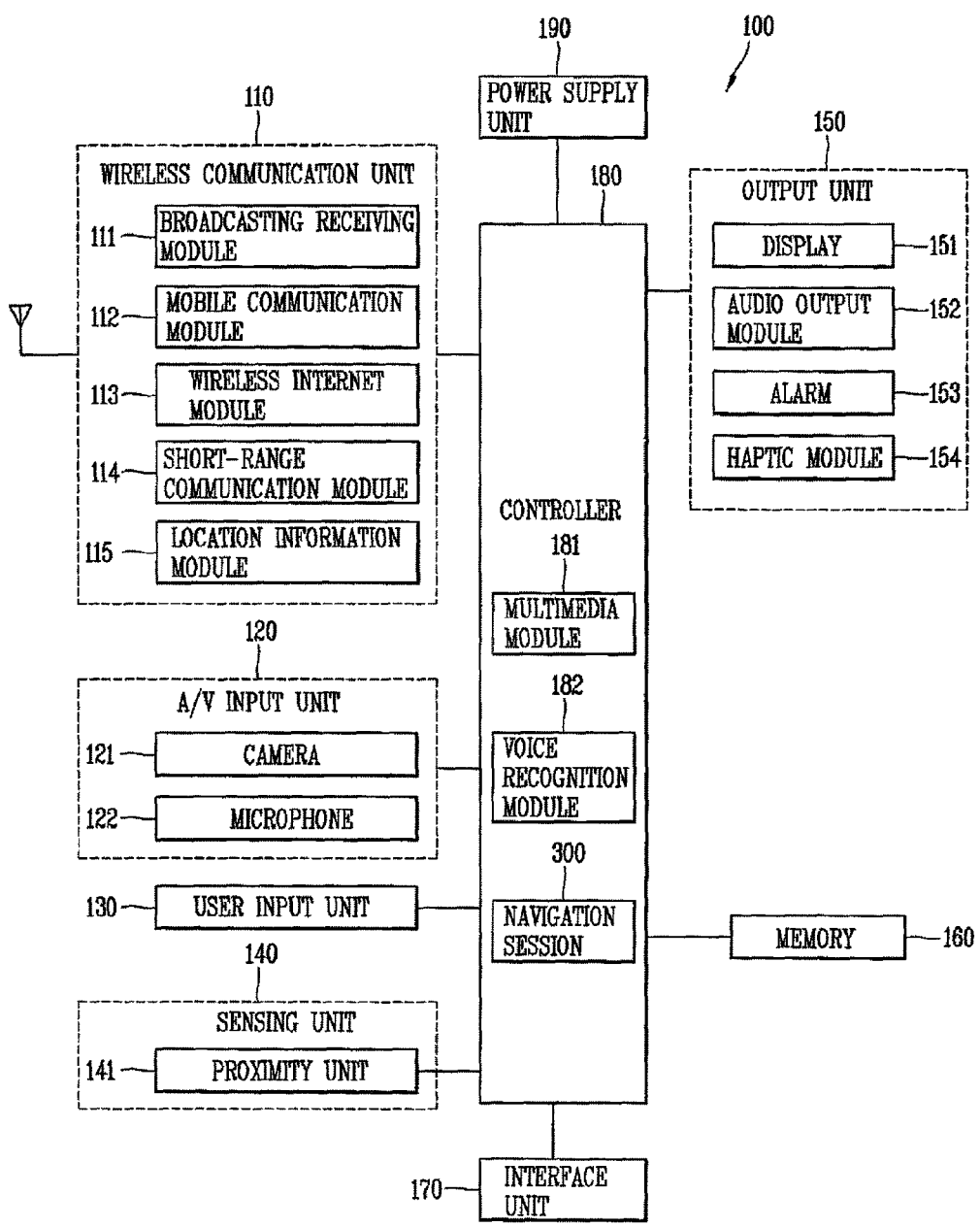
FIG. 1 is a block diagram illustrating a configuration of a mobile communication terminal to which a content control apparatus according to embodiments of the present invention is applied.

FIG. 1 is a block diagram illustrating a configuration of a mobile communication terminal 100 to which a content control apparatus according to embodiments of the present invention is applied. The mobile communication terminal 100 may be implemented in various forms. For example, mobile communication terminals 100 can be portable phone, smart phone, notebook computer, digital broadcast receiver, personal digital assistant (PDA), portable multimedia player (PMP), and the like.

As illustrated in FIG. 1, the mobile communication terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. The mobile communication terminal 100 may be implemented with greater or fewer elements than the elements as illustrated in FIG. 1.

The wireless communication unit 110 typically includes one or more elements allowing radio communication between the mobile communication terminal 100 and a wireless communication system, or between the mobile communication terminal 100 and a network, in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may generate and transmit a broadcast signal and/or broadcast associated information or receive a previously generated broadcast signal and/or broadcast associated information and then transmit the same to the mobile communication terminal 100. Here, the broadcast associated information may include information regarding a broadcast channel, a broadcast program, a broadcast service provider, and the like. Further, the broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network. In this case, the broadcast associated information may be received by the mobile communication module 112. The broadcast signal may exist in various forms. For example, the broadcast signal may be an electronic program guide (EPG) of digital multimedia broadcasting (DMB), electronic service guide (ESG) of digital video broadcast-handheld (DVB-H), and the like.

Further, the broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal, and a server over a mobile communication network. Here, the radio signal may include a voice call signal, a video call signal and/or various types of data according to text and/or multimedia message transmission and/or reception.

The wireless Internet module 113 may support wireless Internet access and may be built-in or externally installed to the mobile communication terminal 100. Here, the wireless Internet module 113 may use wireless Internet access technique including a WLAN (Wireless LAN), Wi-Fi, WiBro (Wireless Broadband), WiMax (World Interoperability for Microwave Access), HSDPA (High Speed Downlink Packet Access), and the like.

The short-range communication module 114 may support a short-range communication and may use a short-range communication technology including Bluetooth, Radio Frequency Identification (RFID), Infrared Data Association (IrDA), Ultra Wideband (UWB), ZigBee, and the like.

The location information module 115 may check or acquire a location of the mobile communication terminal 100. A GPS module may be used as the location information module 114. For example, the GPS module may receive location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system also may be applicable thereto.

Referring to FIG. 1, the A/V (audio/video) input unit 120 may receive an audio or video signal. For example, the A/V (audio/video) input unit 120 includes a camera 121 and a microphone 122. The camera 121 may process an image frame, still picture or video, obtained by an image sensor in a video phone call or an image capturing mode. Further, the processed image frame by the camera 121 may be displayed on a display unit 151, stored in the memory 160 or other storage medium, or transmitted through the wireless communication unit 110. Here, two or more cameras 121 may be provided according to the configuration type and/or use environment of the mobile communication terminal 100.

The microphone 122 included in the A/V input unit 120 may receive an external audio signal through a microphone in a phone call mode, a recording mode, a voice recognition mode, and the like, and process the audio signal into electrical voice data. The processed voice data may be converted and outputted into a format to be transmitted to a mobile communication base station through the mobile communication module 112 in the phone call mode. The microphone 122 may implement various types of noise canceling algorithms to cancel noise generated in a procedure of receiving the external audio signal.

In addition, the user input unit 130 may generate input data to control an operation of the mobile communication terminal 100. The user input unit 130 may include a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 may determine a current status of the mobile communication terminal 100. For example, the sensing unit 140 may determine whether the mobile communication terminal 100 is in an opened or closed state, a location of the mobile communication terminal 100, the presence or absence of user contact, an orientation of the mobile communication terminal 100, an acceleration or deceleration movement of the mobile communication terminal 100, and the like. Further, the sensing unit 140 may generate a sensing signal for controlling the operation of the mobile communication terminal 100. For example, when the mobile communication terminal 100 is a slide phone type, the sensing unit 130 may determine whether the slide phone type mobile communication terminal 100 is in an opened or closed state. Furthermore, the sensing unit 140 may control a sensing function, for example, associated with whether or not power is supplied from the power supply unit 190 and whether or not an external device is coupled with the interface unit 170.

As shown in FIG. 1, the output unit 150 is configured to provide an output for audio signal, video signal, or alarm signal, and the output unit 150 may include the display unit 151, an audio output module 152, an alarm unit 153, and the like. The display unit 151 may display or output information processed in the mobile communication terminal 100. For example, when the mobile communication terminal 100 is in the phone call mode, the display unit 151 may display a User Interface (UI) or a Graphic User Interface (GUI) associated with a call. When the mobile communication terminal 100 is in the video call mode or the image capturing mode, the display unit 151 may display a captured image and/or received image, a UI or GUI.

Further, the display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. Furthermore, two or more display units 151 may be provided according to its embodiment. For example, the mobile communication terminal 100 may include both an external display unit and an internal display unit.

Meanwhile, when the display unit 151 and a sensor for detecting a touch operation (hereinafter, 'touch sensor') are formed with an interlayer structure (hereinafter, 'touch screen'), the display unit 151 may be also used as an input device in addition to an output device. The touch sensor may be configured in a form of, for example, touch film, touch sheet, touch pad, or the like.

Furthermore, the touch sensor may convert a change such as pressure applied to a specific area of the display unit 151 or capacitance generated on a specific area of the display unit 151 into an electrical input signal. The touch sensor may detect a touch input pressure, a touch input position, and a touch input area. For example, when a touch input is made to the touch sensor, a signal (or signals) corresponding to the touch input is sent to a touch controller. Thereafter, the touch controller processes the signal and sends the corresponding data to a controller 180 notifying that a region of the display unit 151 is touched.

Figure 2:
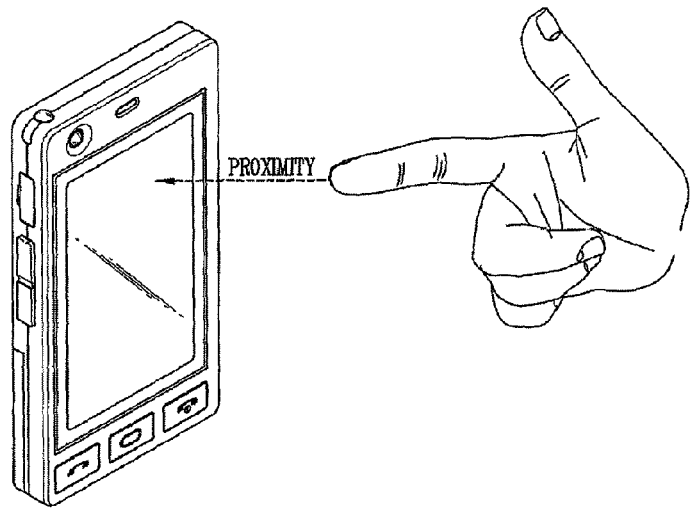
FIG. 2 is a view illustrating a proximity touch process of a mobile communication terminal.

Hereinafter, a proximity sensor 141 of a mobile communication terminal 100 will be described with reference to FIG. 2. FIG. 2 is a view illustrating a proximity-touch process of a mobile communication terminal 100. Here, the proximity-touch occurs when a pointer approaches to a screen while being at a predetermined distance from the screen without actually touching the screen.

The proximity sensor 141 may be arranged in an inner region of the mobile communication terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. Thus, the proximity sensor 141 has a considerably longer life span than a contact type sensor, and it can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like. In particular, when the touch screen is an electrostatic type, the approach of a pointer can be determined based on a change in a field according to the approach of the pointer. In this case, the touch screen (touch sensor) may be classified as a proximity sensor.

Hereinafter, a "proximity touch" may be a state of recognition by the proximity sensor 141 when the pointer is positioned close to the touch screen but not actually brought into contact with the touch screen. On the other hand, a state of recognition of actual contacting of the pointer on the touch screen will be called a "contact touch". The position where the pointer is proximately touched on the touch screen means a position where the pointer is positioned to correspond vertically to the touch screen when the pointer is proximately touched.

Furthermore, the proximity sensor 141 can detect a proximity touch, and a proximity touch pattern, such as a proximity touch distance, a proximity touch direction, a proximity touch speed, a proximity touch time, a proximity touch position, a proximity touch movement state, or the like. Information corresponding to the determined proximity touch operation and the proximity touch pattern can be outputted to the touch screen.

Referring to FIG. 1, the audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may output an audio signal associated with the function performed by the mobile communication terminal 100, such as a call signal reception sound, a message reception sound, etc. The audio output module 152 may include a receiver, a speaker, a buzzer, and the like.

Further, the alarm unit 153 may output a signal to notify the occurrence of an event of the mobile communication terminal 100. Examples of the event occurred in the mobile communication terminal 100 may include call signal reception, message reception, a key signal input, a touch input, and the like. In addition, the alarm unit 153 may output a signal in a different manner, for example, a form of vibration, to notify the occurrence of an event. When a call signal or a message is received, the alarm unit 153 may vibrate the mobile communication terminal 100 through vibration means. When a key signal is inputted, the alarm unit 153 may vibrate the mobile communication terminal 100 through vibration means using a feedback to the key signal input. Here, the user can recognize an occurrence of the through vibration as described above. The signal for notifying an occurrence of the event may be outputted through the display unit 151 or the audio output module 152.

In addition, the haptic module 154 generates various tactile effects, such as vibration, felt by the user. Here, the controller may control the vibration's intensity, pattern, or the like, generated by the haptic module 154. Also, different vibrations may be combined and outputted or sequentially outputted. The haptic module 154, in addition to vibration, may generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device. Further, the haptic module 154 may be implemented to feel a tactile effect through muscular senses by a finger or arm of the user as well as to transfer a tactile effect through direct contact. There may exist two or more haptic modules 154 according to its configuration. The haptic module 154 may be provided at a place frequently being contacted by the user in a vehicle. For example, it may be provided on a steering wheel, a gearshift lever, a seat, or the like.

Next, the memory 160 may store software programs for processing and controlling the controller 180, or may temporarily store inputted and/or outputted data, such as phonebook, message, still image, video, and the like. The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile communication terminal 100 may run a web storage that performs the storage function of the memory 160 over the Internet, or operate in association with the web storage.

Further, the interface unit 170 serves as an interface to every external device that may be connected with the mobile communication terminal 100. For example, the interface unit 170 may include a wired or wireless headset port, an external battery charger port, a wired or wireless data port, a memory card port, a ports for connecting a device having an identification module, an audio input/output (I/O) port, a video input/output (I/O) port, an earphone port, and the like. Here, the identification module, as a chip that stores various information for authenticating the authority to use the mobile communication terminal 100, may include a user identity module (UIM), a subscriber identity module (SIM), a universal subscriber identity module (USIM), and the like. In addition, the device having the identification module (hereinafter, 'identifying device') may be a smart card. Accordingly, the identifying device may be connected with the mobile communication terminal 100 through a port. The interface unit 170 may receive data or power from an external device and transfer the received data or power to every element within the mobile communication terminal 100 or may be used to transfer data within the mobile communication terminal 100 to an external device.

When the mobile communication terminal 100 is connected with an external cradle, the interface unit 170 may allow power from the cradle to be supplied to the mobile communication terminal 100 or allow various command signals inputted from the cradle to be transferred to the mobile communication terminal 100. Various command signals or the power inputted from the cradle may operate as a signal for recognizing when the mobile communication terminal is properly mounted on the cradle.

The controller 180 typically controls a general operation of the mobile communication terminal 100. For example, the controller 180 may control a control and processing operation associated with a voice call, a data communication, a video phone call, and the like. In addition, the controller 180 may include a multimedia module 181 for reproducing multimedia content. Here, the multimedia module 181 may be provided within the controller 180 or may be separately provided from the controller 180. Also, the controller 180 may perform a pattern recognition processing to recognize a handwriting or picture-drawing input performed on the touch screen as a character or image, respectively.

Referring to FIG. 1, the power supply unit 190 receives external or internal power to supply the power required for an operation of each element under a control of the controller 180.

The function of an element applied to the mobile communication terminal 100 may be implemented in a computer-readable medium using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180. For software implementation, the embodiments such as procedures or functions may be implemented together with separate software modules that allow performing of at least one function or operation. Software codes can be implemented by a software application written in any suitable programming language. Here, the software codes may be stored in the memory 160 and executed by the controller 180.

Further, the voice recognition module 182 recognizes a voice uttered by a user, and performs a relevant function based on the recognized voice signal and a navigation session 300 applied to the mobile communication terminal 100 displays a travel path on data map.

On the other hand, a content control apparatus applied to a communication unit 100 according to embodiments of the present invention may include a controller 180 configured to determine a category of an application program from the application program when the application program is generated, determine a representative image (for example, icon) of the application program from the application program, generate a preset icon corresponding to the determined category, and output the representative image and the generated icon; and a display unit 151 configured to display the representative image together with the generated icon on a screen (for example, background screen). The representative image may be an icon indicating the application program.

Further, the controller 180 may download the application program from a server according to a selection by the user. The application program may be a variety of application programs, such as a game program, an entertainment program, various educational programs, a message management program, a calendar management program, a photo management program, a weather information providing program, and the like, and those programs are stored in a memory 160.

Also, the controller 180 may generate the preset icon corresponding to the determined category. The preset icon may be a figure (for example, star shape, rectangular shape, triangular shape, etc.), a symbol, a figure having a color (for example, red, yellow, blue, yellowish green, etc.), an outline to be displayed on the outside of the representative image, an outline having a color to be displayed on an outside of the representative image, and a translucent color to be overlapped with the representative image, and the like.

In addition, the controller 180 may display the preset icon corresponding to the determined category at or near a specific position of the representative image. Additionally, the controller 180 may place and display the preset icon at a position entirely within the representative image or at a position where only partly overlapping with the representative image. For example, the controller 180 may display the preset icon at various positions of the representative image, such as the center, top, bottom, left side, right side, outside, or the like. Further, the controller 180 may generate a preset icon corresponding to the two or more categories, when the application program includes two or more categories (for example, game category, education category, etc.).

Moreover, when the user selects an icon displayed on the representative image, the controller 180 may determine whether a representative image (or representative images) has the same icon as the selected icon. Then, the controller 180 may arrange the determined representative image(s) in a preset direction, for example, horizontal or vertical direction, and display on a background screen of the display unit 151. Further, when the user selects an icon of a specific representative image among the representative images (including an icon) arranged in a preset direction and displayed on the background screen of the display unit 151, the controller 180 may randomly display the arranged and displayed representative images on the background screen of the display unit 151. Also, when the user selects an icon of a specific representative image and then shakes the mobile communication terminal 100, the representative images having the same icon as the selected icon may be arranged in a preset direction and be displayed on the background screen of the display unit 151.

Additionally, the controller 180 may count the execution number of the application program, and set the application program to a preferred application program when the counted execution number is equal to or greater than a preset number (for example, 5-10 times). Then, the controller 180 may generate a preset icon corresponding to the representative image of the preferred application program, and display the generated icon together with the representative image of the preferred application program on the display unit 151. Here, when the user selects a key for checking a preferred application program, the controller 180 may display the representative image of the preferred application program together with the generated icon on the display unit 151.

The controller 180 may also display preset icons corresponding to the representative images of the application programs having different categories in a different manner to one another. For example, an icon displayed on the representative image of a game program may be displayed in a star shape, and an icon displayed on the representative image of an education program may be displayed in a rectangular shape, and an icon displayed on the representative image of the preferred application program may be displayed in a triangular shape. Here, the icon displayed on the representative image may be changed according to a designer's or user's request.

Figure 3:
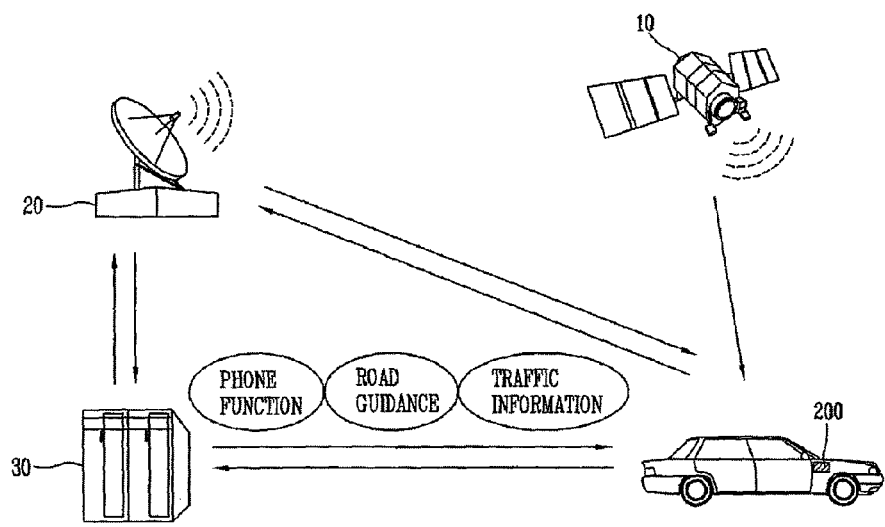
FIG. 3 is a block diagram illustrating a vehicle navigation system to which a content control apparatus according to embodiments of the present invention is applied.

FIG. 3 is a block diagram illustrating a vehicle navigation system to which a content control apparatus according to embodiments of the present invention is applied. As illustrated in FIG. 3, the vehicle navigation system may include an information providing center 30 for providing traffic information and various data (for example, programs, execution files, etc.), and a telematics terminal 200 mounted within a vehicle. The telematics terminal 200 is configured to receive traffic information through a long-range wireless communication network 20 and/or a short-range wireless communication network, and to provide a road guide service based on a GPS signal received through a satellite 10 and the traffic information.

Figure 4:
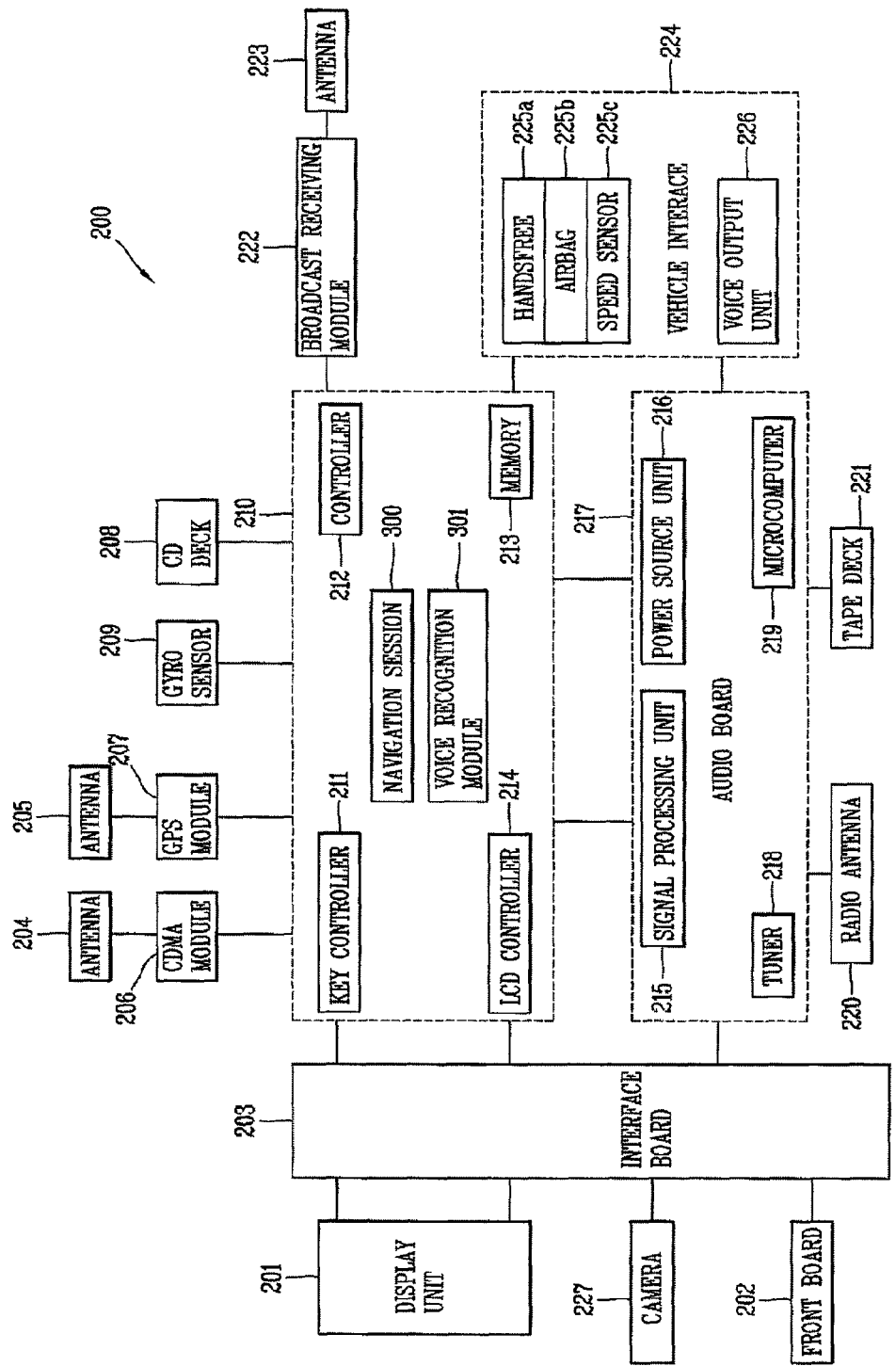
FIG. 4 is a block diagram illustrating a configuration of a telematics terminal to which a content control apparatus according to embodiments of the present invention is applied.

Hereinafter, a configuration of a telematics terminal 200 to which a control content apparatus according to embodiments of the present invention is applied will be described with reference to FIG. 4. FIG. 4 is a block diagram illustrating a configuration of a telematics terminal according to embodiments of the present invention.

As illustrated in FIG. 4, the telematics terminal 200 may include a central processing unit (CPU) 212 for controlling the overall operation of telematics terminal 200, a memory 213 for storing a variety of information, a key controller 211 for controlling a variety of key signals, and a main board 210 having an LCD controller 214 for controlling an liquid crystal display device (LCD). The memory 213 stores map information (map data) for displaying road guide information on a digital map. In addition, the memory 213 stores information for an algorithm of controlling traffic information collection based on an input of traffic information including a road condition in which a vehicle is currently traveling, and information for controlling the algorithm.

First, the main board 210 may include a code division multiple access (CDMA) module 206 having a unique device number built in a vehicle serving as a mobile communication terminal. The main board 210 may also include a GPS module 207 for receiving a GPS signal to guide a location of a vehicle and to track a traveling path from a departure to a destination, and for transmitting traffic information collected by the user as a global positioning system (GPS) signal. The main board 210 may include a CD deck 208 for reproducing a signal recorded on a compact disk (CD), a gyro sensor 209, and the like. The CDMA module 206 and the GPS module 207 are configured to transmit and receive a signal through antennas 204 and 205.

In addition, a broadcast receiving module 222 is connected to the main board 210 and receives broadcast signals through the antenna 223. Further, the main board 210 is connected via an interface board 203 to a display unit (LCD) 201 controlled by the LCD controller 214, a front board 202 controlled by a key controller 211, and a camera 227 for capturing an inside and/or outside of the vehicle via an interface board 203.

The audio board 217 is connected to the main board 210 and processes a variety of audio signals. The audio board 217 may include a microcomputer 219 for controlling the audio board 217, a tuner 218 for receiving a radio signal, a power unit 216 for supplying power to the microcomputer 219, and a signal processing unit 215 for processing a variety of voice signals. In addition, the audio board 217 may include a radio antenna 220 for receiving a radio signal and a tape deck 221 for reproducing an audio tape. The audio board 217 may further include an audio output unit (amplifier) 226 for outputting a voice signal processed by the audio board 217.

The audio output unit (amplifier) 226, the audio board 217, and the main board 210 may be connected to a vehicle interface 224. Additionally, a hands-free unit 225*a* for inputting a voice signal, an airbag 225*b* for passenger safety, a speed sensor 225*c* for determining a vehicle speed and the like may be connected to the vehicle interface 224. Here, the speed sensor 225*c* calculates a vehicle speed, and provides the calculated vehicle speed information to the central processing unit 212.

The display unit 201 may display a variety of video signals and text signals. Further, the front board 202 may include buttons for inputting a variety of key signals so as to provide a key signal corresponding to a button selected by the user to the main board 210. The front board 202 may also include a menu key to receive a direct input of traffic information to be controlled by the key controller 211. In addition, the display unit includes a proximity sensor and a touch sensor (touch screen) of FIG. 2. Here, the display unit 201 may sense a proximity touch within the display window through a proximity sensor. For example, when a pointer, such as a finger or a stylus pen, is proximity-touched, the display unit 201 determines the position of the proximity touch, and outputs position information corresponding to the determined position to the controller 212. Also, the voice recognition device (or voice recognition module) 301 recognizes a voice uttered by a user, and performs a relevant function based on the recognized voice signal.

Next, the navigation session 300 applied to the telematics terminal 200 may generate road guide information based on map data and current vehicle location information, and notify the generated road guide information to the user. For example, the navigation session 300 displays a travel path on the data map, and automatically forms a wireless network together with a terminal (for example, vehicle navigation device) mounted on a neighboring vehicle and/or a mobile communication terminal carried by a neighboring pedestrian through a wireless communication (for example, short-range wireless communication network) when the location of the mobile communication terminal 100 is within a predetermined distance from a dead zone included in the travel path. Accordingly, the telematic terminal 200 may receive the location information of the neighboring vehicle from the terminal mounted on the neighboring vehicle, and the location information of the neighboring pedestrian from the mobile communication terminal carried by the neighboring pedestrian.

On the other hand, a content control apparatus applied to a communication unit 200 according to embodiments of the present invention may include a controller 212 configured to determine a category of an application program from the application program when the application program is generated, determine a representative image (for example, icon) of the application program from the application program, generate a preset icon corresponding to the determined category, and output the representative image and the generated icon; and a display unit 201 configured to display the representative image together with the generated icon on a screen (for example, background screen). The representative image may be an icon indicating the application program.

Further, the controller 212 may download the application program from a server according to a selection by the user. The application program may be a variety of application programs, such as a game program, an entertainment program, various educational programs, a message management program, a calendar management program, a photo management program, a weather information providing program, and the like, and those programs are stored in a memory 213.

Also, the controller 212 may generate the preset icon corresponding to the determined category. The preset icon may be a figure (for example, star shape, rectangular shape, triangular shape, etc.), a symbol, a figure having a color (for example, red, yellow, blue, yellowish green, etc.), an outline to be displayed on the outside of the representative image, an outline having a color to be displayed on an outside of the representative image, and a translucent color to be overlapped with the representative image, and the like.

In addition, the controller 212 may display the preset icon corresponding to the determined category at or near a specific position of the representative image. Additionally, the controller 212 may place and display the preset icon at a position entirely within the representative image or at a position where only partly overlapping with the representative image. For example, the controller 212 may display the preset icon at various positions of the representative image, such as the center, top, bottom, left side, right side, outside, or the like. Further, the controller 212 may generate a preset icon corresponding to the two or more categories, when the application program includes two or more categories (for example, game category, education category, etc.).

Moreover, when the user selects an icon displayed on the representative image, the controller 212 may determine whether a representative image (or representative images) has the same icon as the selected icon. Then, the controller 212 may arrange the determined representative image(s) in a preset direction, for example, horizontal or vertical direction, and display on a background screen of the display unit 201. Further, when the user selects an icon of a specific representative image among the representative images (including an icon) arranged in a preset direction and displayed on the background screen of the display unit 201, the controller 212 may randomly display the arranged and displayed representative images on the background screen of the display unit 201. Also, when the user selects an icon of a specific representative image and makes a shaking movement on the touch screen, the representative images having the same icon as the selected icon may be arranged in a preset direction on the background screen of the display unit 201 or randomly be arranged according to the number of shaking movement made.

Additionally, the controller 212 may count the execution number of the application program, and set the application program to a preferred application program when the counted execution number is equal to or greater than a preset number (for example, 5-10 times). Then, the controller 212 may generate a preset icon corresponding to the representative image of the preferred application program, and display the generated icon together with the representative image of the preferred application program on the display unit 201. Here, when the user selects a key for checking a preferred application program, the controller 212 may display the representative image of the preferred application program together with the generated icon on the display unit 201.

The controller 212 may also display preset icons corresponding to the representative images of the application programs having different categories in a different manner to one another. For example, the controller 212 may display an icon displayed on the representative image of a game program in a star shape, and may display an icon displayed on the representative image of an education program in a rectangular shape, and may display an icon displayed on the representative image of the important application program in a triangular shape. Here, the icon displayed on the representative image may be changed according to a designer's or user's request.

Figure 5:
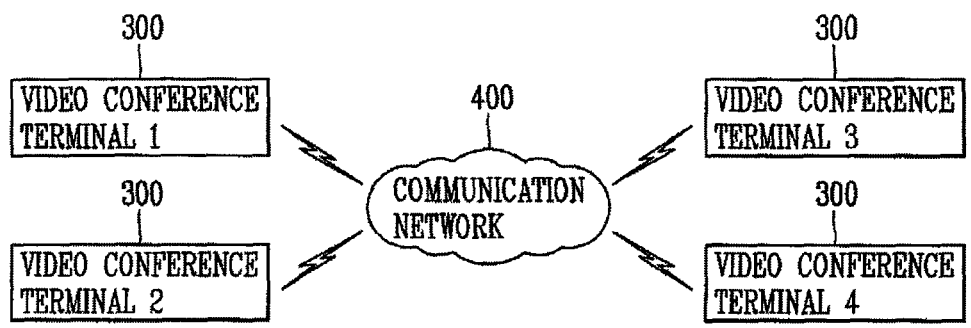
FIGS. 5 and 6 are block diagrams illustrating a schematic configuration of a video conference system (video communication system) to which a content control apparatus according to embodiments of the present invention is applied.
Figure 6:
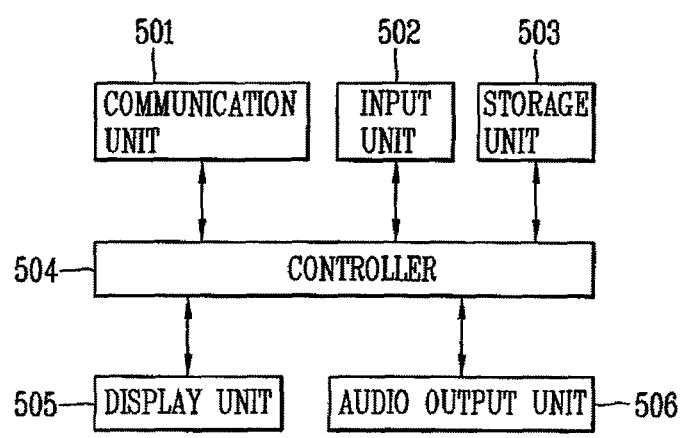

FIGS. 5 and 6 are block diagrams illustrating a schematic configuration of a video conference system (video communication system) according to embodiments of the present invention. As illustrated in FIG. 5, a video conference system may include a plurality of video conference terminals 300, and a communication network 400 connecting the plurality of video conference terminals 300 to one another in a wired/wireless communication scheme. Here, the communication network 400 may include a bridge, a gateway, a router, a hub, and the like.

As illustrated in FIG. 6, the video conference terminal 300 includes a communication unit 501, an input unit 502, a storage unit 503, a controller 504, a display unit 505, and an audio output unit 506. The video conference terminal 300 may be implemented with greater or fewer elements than those elements as illustrated in FIG. 6.

Referring to FIG. 5, the video conference terminal 300 may transmit and/or receive video and/or voice data and control signals, and the like, to and/or from at least one of video conference terminals included in the video conference system by a preset communication protocol. A plurality of video conference terminals 300 included in the video conference system may be coupled with terminals using homogeneous protocols or terminals using heterogeneous protocols. Further, the plurality of video conference terminals 300 may follow a recommendation of ITU-T (ITU Telecommunication Standardization Sector) for multi video conference (including H.323), a recommendation of IETF (Internet Engineering Task Force) (including Session Initiation Protocol (SIP), etc.), a recommendation jointly proposed by ITU-T and IETF (including Media Gateway Control (MEGACO), 11.248, etc.) or MGCP (Media Gateway Control Protocol). Therefore, a video conference can be performed regardless of the kind of terminals. Additionally, the video conference terminal 300 may include a video conference dedicated terminal, a smart phone, a portable terminal, a mobile terminal, a personal digital assistant (PDA), a notebook computer, a WiBro terminal, an Internet protocol television (IPTV), a telematics terminal, and the like.

Referring to FIG. 6, the communication unit 501 may transmit and receive voice and video data between the plurality of the video conference terminals 300 and any other external video conference terminals. As such, the communication unit 501 may include at least one element for performing wired/wireless communication between a plurality of video conference terminals 300 or between the video conference terminal 300 and a network 400 in which the video conference terminal 300 is located. The communication unit 501 may also communicate with an external terminal via the network 400 based on a unique IP address, that may be preset or randomly set in the video conference terminal 300. Further, the communication unit 501 may transmit and/or receive wireless signals to and/or from at least one of a base station, an external terminal (including video conference terminal, mobile terminal, etc.), and a server. Here, the wireless signal may include various types of data based on the transmission and reception of a voice call signal, a video call signal, and/or a text/multimedia message.

In addition, the communication unit 501 may include a module for wireless Internet access or a module for short range communication. Here, a wireless Internet access technology includes WLAN (Wireless LAN), Wi-Fi, WiBro (Wireless Broadband), WiMax (World Interoperability for Microwave Access), HSDPA (High Speed Downlink Packet Access), and the like. Furthermore, a short-range communication technology includes Bluetooth, Radio Frequency Identification (RFID), Infrared Data Association (IrDA), Ultra Wideband (UWB), ZigBee, and the like.

Referring to FIG. 6, the input unit 502 may generate input data which allows the user to control an operation of the video conference terminal 300. First, the input unit 502 receives a command or control signal corresponding to the manipulation of touching, scrolling a displayed screen, or the like. The input unit 502 may include a keypad, a dome switch, a touch pad (pressure/capacitance), a touch screen, a jog wheel, a jog switch, a jog shuttle, and the like.

The input unit 502 may also include at least one or more microphones and cameras for receiving an audio or video signal. Here, the microphone receives an external audio signal in a phone call mode, a recording mode, a voice recognition mode, a video conference mode, and the like, and processes the audio signal into electrical voice data. Further, the microphone may output the processed voice data through the audio output unit 506, or convert the audio signal into a format capable of being transmitted to an external terminal and then output the converted signal through the communication unit 501. Also, the microphone may implement various types of noise canceling algorithms to cancel noise generated in a procedure of receiving the external audio signal.

In addition, the camera processes an image frame, still or moving picture, obtained by an image sensor in a video phone call mode, an image capturing mode, the video conference mode, or the like. In other words, the relevant image data obtained by the image sensor based on codec is decoded to meet each standard. Further, the controller 504 may control the processed image frames to be displayed on the display unit 505. Also, the image frames processed in the camera may be stored in the storage unit 503 or transmitted to the outside, including any video conference terminal included in a video conference system, through the communication unit 501.

Next, the storage unit 503 may store software programs for processing and controlling the controller 504 or temporarily store inputted and/or outputted data, such as phonebook, message, still image, video, audio data, and the like. The storage unit 503 may also store data associated with vibration and sound having various patterns to be outputted when a touch was input on the touch screen. Further, the storage unit 503 may store data, a program, and the like, which are required to operate the video conference terminal 300 and/or video conference system and various user interfaces (UIs) and/or graphic user interfaces (GUIs). Additionally, the storage unit 503 may store shared information on at least one or more application programs provided in the video conference terminal 300, setting menu information (or shared information) on at least one or more files associated with the application program, and store shared information on any file, and shared information of an external terminal transmitted from any external terminal by a control of the 504.

Here, the storage unit 503 stores various management information such as video codec setting information (including video/audio/codec setting information, etc.), call standard setting information (including 11.323, SIP, MGCP, INAP (Intelligent Network Application Protocol), ISUP (ISUP, ISDN user part), TCAP (Transmission Control Application Part), MEGACO, H.248, V.35/RS-449/RS-530 setting information, ISDN (International Services Digital Network), basic paging setting information, etc.), network setting information (Network Address Translation (NAT)), DNS (Domain Name Service), IP address, QoS information, streaming information, SNMP (including a simple network management protocol), security setting information (including firewall setting information, etc.), and the like.

Further, the storage unit 503 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like.

Referring to FIG. 6, the controller 504 controls an overall operation of the video conference terminal 300. For example, the controller 504 performs a control and processing associated with voice communication, data communication, video communication, video conference, and the like.

Here, the controller 504 may include a multimedia module for playing multimedia files. The multimedia module may be implemented within the controller 504, or implemented separately from the controller 504. Also, the controller 504 may perform a pattern recognition processing to recognize a handwriting or picture-drawing input performed on the touch screen as a character or image, respectively.

Also, the controller 504 may generate a message for transmitting management information of the relevant terminal to any (or specific) external video conference terminal connected through the communication network 400, and transmits the generated message to the any external video conference terminal through the communication network 400. Further, the controller 504 may generate a message for transmitting management information of the relevant terminal to a router (or any router in which management information of at least any one or more external video conference terminals is stored) most adjacent to the video conference terminal 300. Here, the communication network 400 includes at least one or more routers. Then, the controller 504 connects the video conference terminal 300 and at least one or more external video conference terminals, and transmits the generated message to the router most adjacent to the video conference terminal 300.

In addition, the controller 504 may store management information transmitted from the any external video conference terminal or management information transmitted from the router most adjacent to the video conference terminal 300 in the storage unit 503. Also, the controller 504 may parse the transmitted management information in the storage unit 503, and display information including at least one or more video codec setting information, call standard setting information, network setting information, security setting information, and the like, included in the parsed management information on the display unit 505.

Further, controller 504 may reconfigures the management information displayed on the display unit 505 based on an input value received from the input unit 502 by a control of the user, and stores the reconfigured management information in the storage unit 503. In addition, the controller 504 may transmit the reconfigured management information to the any external video conference terminal and/or the router most adjacent to the video conference terminal 300 through the communication network 400.

For example, if a management information transmission request message of the video conference terminal 300 is received from the any external video conference terminal, then the controller 504 transmits management information of the video conference terminal 300 previously stored in the storage unit storage unit 503 to the any external video conference terminal. On the other hand, If a management information transmission request message of the video conference terminal 300 is received from the router most adjacent to the video conference terminal 300, then the controller 504 transmits management information of the video conference terminal 300 previously stored in the storage unit 503 to the router most adjacent to the video conference terminal 300.

Further, if reconfigured management information is received from the any external video conference terminal, then the controller 504 reconfigures (or updates) the management information previously stored in the storage unit 503 based on the received reconfigured management information or transmits the received reconfigured management information to a specific video conference terminal (excluding the any video conference terminal) connected to the video conference system. However, if the reconfigured management information is received from the router most adjacent to the video conference terminal 300, then the controller 504 reconfigures management information previously stored in the storage unit 503 based on the received reconfigured management information.

In addition, if at least any one or more external terminals included in the video conference system are operated with the video conference system, then the controller 504 processes video and/or voice information transmitted from the external terminal into a predetermined signal and outputs to the display unit 505 and/or audio output unit 506.

Also, if at least any one or more external terminals included in the video conference system are operated with the video conference system, then the controller 504 processes video and/or voice information received through the input unit 502 into a predetermined signal and outputs the processed video and/or voice information to at least any one or more video conference terminals connected to the video conference system. In addition, the controller 504 may output the signal-processed video and/or voice information to the display unit 505 and/or audio output unit 506.

Further, the controller 504 may generate a message for requesting the shared information transmission of a specific program, such as an application program, a file associated with the relevant application program, any file, etc., provided in the any video conference terminal 300 with respect to any or specific video conference terminal 300 connected to the video conference system, and transmits the generated shared information transmission request message or setting menu information transmission request message to the any video conference terminal through the communication network 400. Then, the controller 504 may output the transmitted shared information through the display unit 505 and/or the audio output unit 506 in response to the shared information transmission request message. The controller 504 may further reconfigure the shared information based on an input value received from the user through the input unit 502 and store the reconfigured information in the storage unit 503. Accordingly, the controller 504 may transmit the reconfigured shared information to the any video conference terminal.

Also, the controller 504 may transmit the reconfigured shared information to the any other video conference terminal 300. For example, if a transmission request message for shared information previously stored in the storage unit 503 is received from any (or specific) video conference terminal 300 connected to the video conference system, then the controller 504 may transmit the shared information previously stored in the storage unit 503 to the any video conference terminal 300.

The controller 504 also may receive reconfigured shared information from the any video conference terminal, and store the received reconfigured shared information in the storage unit 503. At this time, the storage unit 503 may update the prestored shared information into the received reconfigured shared information, or store the received reconfigured shared information separately from the prestored shared information.

In addition, the controller 504 may control to execute a specific application program or file provided in the video conference terminal 300 based on the received reconfigured shared information to output through the display unit 505 and/or the audio output unit 506. Here, the controller 504 may control to execute a specific application program or file provided in the video conference terminal 300 based on shared information previously stored in the storage unit 503 to output through the display unit 505 and/or the audio output unit 506.

Referring to FIG. 6, the display unit 505 may output video information included in a signal that is processed into a predetermined signal by a control of the controller 504. The display unit 505 may include at least one of a liquid crystal display (LCD), a thin film transistor-liquid crystal display (TFT-LCD), an organic light-emitting diode (OLED) display, a flexible display, and a three-dimensional (3D) display.

The display unit 505 also may display management information including at least one or more video codec setting information, call standard setting information, network setting information, and security setting information, outputted from the controller 504. Here, the display unit 505 may receive the user's input using a touch screen method. Further, the display unit 505 may display various contents such as various menu screens, and the like, using a user interface and/or graphic user interface previously stored in the storage unit 503 when displaying the management information. Here, the contents displayed on the display unit 505 may include a menu screen or the like, including data, such as various texts or image data and icons, list menus, combo boxes, and the like.

In addition, the haptic module 154 generates various tactile effects, such as vibration, felt by the user. Here, the controller may control the vibration's intensity, pattern, or the like, generated by the haptic module 154. Also, different vibrations may be combined and outputted or sequentially outputted. The haptic module 154, in addition to vibration, may generate various tactile effects, including an effect by stimulation such as a pin arrangement vertically moving against the contacted skin surface, an ejection or suction force of air through the ejection or suction port, a brush against the skin surface, a contact of the electrode, electrostatic force, or the like, or an effect by reproduction of thermal sense using a heat absorption or generation device. Further, the haptic module 154 may be implemented to feel a tactile effect through muscular senses by a finger or arm of the user as well as to transfer a tactile effect through direct contact. The video conference system 300 may include two or more haptic modules 154 according to the configuration type of the video conference terminal 300.

Referring to FIG. 6, the audio output unit 506 may output voice information included in a signal that is processed into a predetermined signal by the controller 504. Here, the audio output unit 506 may be a speaker. Also, the audio output unit 506 may output audio data received from the communication unit 501 or stored in the storage unit 503 in a video conference mode, a phone call mode, a recording mode, and the like.

The video conference terminal 300 may further include an interface unit performing a role of interfacing with all external devices connected to the video conference terminal 300. For example, the interface unit may include a wired/wireless headset port, an external charger port, a wired/wireless data port, a memory card port, a port for a device having an identification module, an audio Input/Output (I/O) port, a video I/O port, an earphone port, and the like. Here, the identification module may be a chip for storing various information to authenticate an authority for using the video conference terminal 300. The identification module may include a User Identity Module (UIM), a Subscriber Identity Module (SIM), a Universal Subscriber Identity Module (USW), and the like.

Also, the device provided with the identification module may be implemented in the type of a smart card. Hence, the identification device may be coupled to the video conference terminal 300 via a port. The interface unit may receive data or power from an external device and transfer the received data or power to each constituent element within the video conference terminal 300, or transmit data within the video conference terminal 300 to the external device.

When the video conference terminal 300 is connected with an external cradle, the interface unit may allow power from the cradle to be supplied to the video conference terminal 300 or may allow various command signals inputted from the cradle to be transferred to the video conference terminal 300. Various command signals or the power received from the cradle may operate as a signal for recognizing when the video conference terminal 300 is correctly mounted on the cradle.

The router may include management information for each of a plurality of video conference terminals connected through the communication network 400. In other words, the router may include management information including video codec setting information, call standard setting information, network setting information, and security setting information, for each of the plurality of video conference terminals connected through the communication network 400. Also, if a management information transmission request message is received from any video conference terminal 300 connected to the video conference system, then the router may transmit management information previously stored in the router to the relevant video conference terminal 300.

If reconfigured management information is received from any video conference terminal 300 connected to the video conference system, then the router updates the management information previously stored in the router into the received reconfigured management information, or transmits the received reconfigured management information to a specific video conference terminal (excluding the any video conference terminal) connected to the video conference system.

On the other hand, a content control apparatus applied to a communication unit 300 according to embodiments of the present invention may include a controller 504 configured to determine a category of an application program from the application program when the application program is generated, determine a representative image (for example, icon) of the application program from the application program, generate a preset icon corresponding to the determined category, and output the representative image and the generated icon; and a display unit 505 configured to display the representative image together with the generated icon on a screen (for example, background screen). The representative image may be an icon indicating the application program.

Further, the controller 504 may download the application program from a server according to a selection by the user. The application program may be a variety of application programs, such as a game program, an entertainment program, various educational programs, a message management program, a calendar management program, a photo management program, a weather information providing program, and the like, and those programs are stored in a memory 503.

Also, the controller 504 may generate the preset icon corresponding to the determined category. The preset icon may be a figure (for example, star shape, rectangular shape, triangular shape, etc.), a symbol, a figure having a color (for example, red, yellow, blue, yellowish green, etc.), an outline to be displayed on the outside of the representative image, an outline having a color to be displayed on an outside of the representative image, and a translucent color to be overlapped with the representative image, and the like.

In addition, the controller 504 may display the preset icon corresponding to the determined category at or near a specific position of the representative image. Additionally, the controller 504 may place and display the preset icon at a position entirely within the representative image or at a position where only partly overlapping with the representative image. For example, the controller 504 may display the preset icon at various positions of the representative image, such as the center, top, bottom, left side, right side, outside, or the like. Further, the controller 504 may generate a preset icon corresponding to the two or more categories, when the application program includes two or more categories (for example, game category, education category, etc.).

Moreover, when the user selects an icon displayed on the representative image, the controller 504 may determine whether a representative image (or representative images) has the same icon as the selected icon. Then, the controller 504 may arrange the determined representative image(s) in a preset direction, for example, horizontal or vertical direction, and display on a background screen of the display unit 505. Further, when the user selects an icon of a specific representative image among the representative images (including an icon) arranged in a preset direction and displayed on the background screen of the display unit 505, the controller 504 may randomly display the arranged and displayed representative images on the background screen of the display unit 505. Also, when the user selects an icon of a specific representative image and makes a shaking movement on the touch screen, the representative images having the same icon as the selected icon may be arranged in a preset direction and be displayed on the background screen of the display unit 505.

Additionally, the controller 504 may count the execution number of the application program, and set the application program to a preferred application program when the counted execution number is equal to or greater than a preset number (for example, 5-10 times). Then, the controller 504 may generate a preset icon corresponding to the representative image of the preferred application program, and display the generated icon together with the representative image of the preferred application program on the display unit 505. Here, when the user selects a key for checking a preferred application program, the controller 504 may display the representative image of the preferred application program together with the generated icon on the display unit 505.

The controller 504 may also display preset icons corresponding to the representative images of the application programs having different categories in a different manner to one another. For example, an icon displayed on the representative image of a game program may be displayed in a star shape, and an icon displayed on the representative image of an education program may be displayed in a rectangular shape, and an icon displayed on the representative image of the preferred application program may be displayed in a triangular shape. Here, the icon displayed on the representative image may be changed according to a designer's or user's request.

Hereinafter, a control content apparatus and method according to a first embodiment of the present invention will be described with reference to FIGS. 7 through 10. The control content apparatus and method thereof according to a first embodiment of the present invention may be applicable to a mobile communication terminal 100, the telematics terminal 200, and a video conference terminal, as well as applicable to a smart phone, a notebook computer, a digital broadcast receiver, a personal digital assistant (PDA), a portable multimedia player (PMP), a desktop computer, a television, various video player, and the like.

Figure 7:
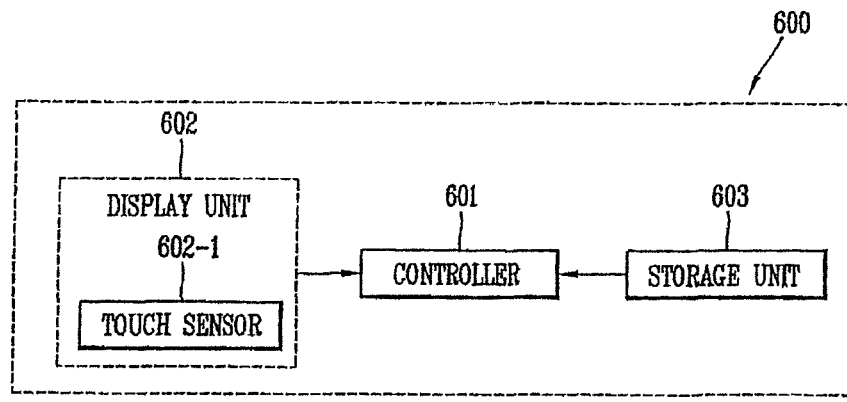
FIG. 7 is a block diagram illustrating a content control apparatus according to a first embodiment of the present invention.

FIG. 7 is a block diagram illustrating a content control apparatus according to a first embodiment of the present invention. As illustrated in FIG. 7, a content control apparatus 600 according to a first embodiment of the present invention includes a controller 601.

The controller 601 configured to determine a category of an application program from the application program when the application program is generated, determine a representative image (for example, icon) of the application program from the application program, generate a preset icon corresponding to the determined category, and output the representative image and the generated icon; and a display unit 602 configured to display the representative image together with the generated icon on a screen (for example, background screen). The representative image may be an icon indicating the application program.

Further, the controller 601 may download the application program from a server according to a selection by the user. The application program may be a variety of application programs, such as a game program, an entertainment program, various educational programs, a message management program, a calendar management program, a photo management program, a weather information providing program, and the like, and those programs are stored in a memory 603.

Also, the controller 601 may generate the preset icon corresponding to the determined category. The preset icon may be a figure (for example, star shape, rectangular shape, triangular shape, etc.), a symbol, a figure having a color (for example, red, yellow, blue, yellowish green, etc.), an outline to be displayed on the outside of the representative image, an outline having a color to be displayed on an outside of the representative image, and a translucent color to be overlapped with the representative image, and the like.

In addition, the controller 601 may display the preset icon corresponding to the determined category at or near a specific position of the representative image. Additionally, the controller 504 may place and display the preset icon at a position entirely within the representative image or at a position where only partly overlapping with the representative image. For example, the controller 601 may display the preset icon at various positions of the representative image, such as the center, top, bottom, left side, right side, outside, or the like.

Further, the controller 601 may generate a preset icon corresponding to the two or more categories, when the application program includes two or more categories (for example, game category, education category, etc.).

Moreover, when the user selects an icon displayed on the representative image, the controller 601 may determine whether a representative image (or representative images) has the same icon as the selected icon. Then, the controller 601 may arrange the determined representative image(s) in a preset direction, for example, horizontal or vertical direction, and display on a background screen of the display unit 602. Further, when the user selects an icon of a specific representative image among the representative images (including an icon) arranged in a preset direction and displayed on the background screen of the display unit 602, the controller 601 may randomly display the arranged and displayed representative images on the background screen of the display unit 602. Also, when the user selects an icon of a specific representative image and makes a shaking movement on the touch screen, the representative images having the same icon as the selected icon may be arranged in a preset direction and be displayed on the background screen of the display unit 602.

Figure 8:
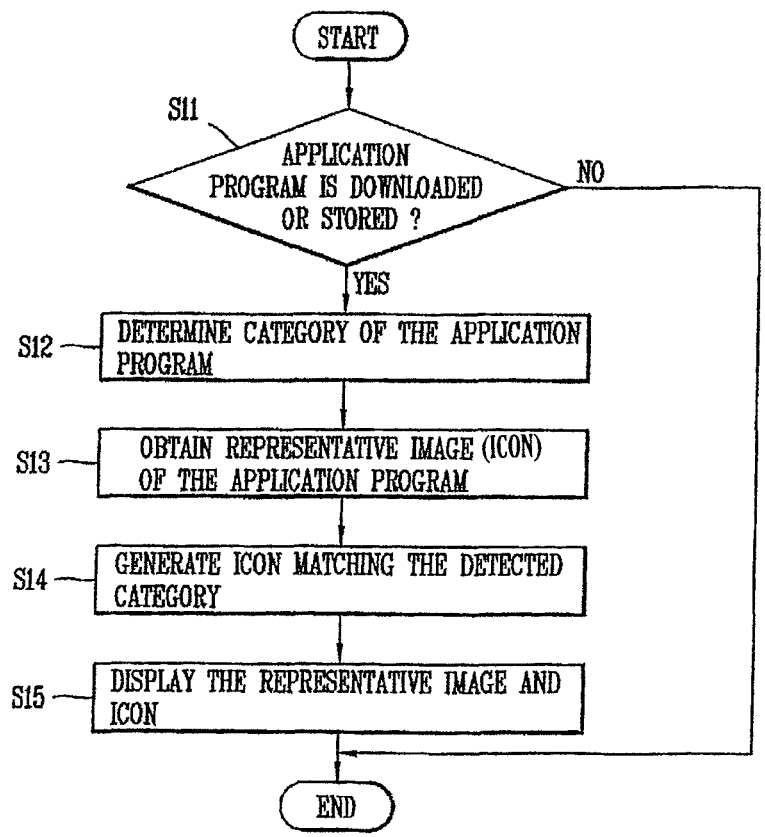
FIG. 8 is a flow chart illustrating a content control method according to a first embodiment of the present invention.

FIG. 8 is a flow chart illustrating a content control method according to a first embodiment of the present invention.

First, the controller 601 determines whether or not the application program is downloaded or stored (S11), and determines a category of the application program from the application program when the application program is downloaded or stored (S12). For example, the controller 601 may determine category information included in attribute information of the application program, or determine a category of the application program based on an extension of the application program. Here, the attribute information of the application program includes category information. Further, the controller 601 downloads the application program from a server through a communication unit and installs the downloaded application program in the storage unit 603. On the other hand, when the controller determines that the category information is not included in the attribute information of the application program, the user may set the category information.

When the controller 601 determines that the application program is downloaded or stored, the controller 601 obtain a representative image, an icon indicating the application program, of the application program from the application program (S13). For example, when one application program is installed in the storage unit 603 among a variety of application programs, such as a game program, an entertainment program, various educational programs, a message management program, a calendar management program, a photo management program, a weather information providing program, and the like, the controller 601 obtains a representative image indicating the application program such as an icon from the any one application program.

Thereafter, the controller 601 generates a preset icon corresponding to the category of the application program (S14). For example, the controller 601 may generate a star-shaped figure when the category of the application program is a game category, generate a rectangular-shaped figure when the category of the application program is an education category, and generate a triangular-shaped figure when the category of the application program is a weather category. These figures are icons indicating different categories of the application programs, and the controller 601 generates an icon (for example, figure, symbol, color, etc.) indicating that the category of the application program is game when the category of the application program is game.

The controller 601 may further include a text corresponding to the category in the icon. For example, the controller 601 may include a text in the icon indicating that the particular category of the application program is game. Here, the icon displayed according to the category may be changed in various manners according to a designer's or user's request.

Then, the controller 601 displays a preset icon corresponding to a representative image of the application program and a category of the application program on the display unit 602 (S15). For example, the controller 601 displays a preset icon corresponding to a category of the application program at a specific position of the representative image of the application program. In particular, the controller 601 may display the preset icon at the upper right side of the representative image or at the outside of the representative image. Further, the controller may display the preset icon to be positioned within the representative image or to be partially overlapped with the representative image. Also, the controller 601 may or may not display the icon on the representative image of the application program according to the user's request. In addition, the controller 601 may sort out representative images having no icon indicating the category, and display the sorted-out representative images on the display unit 602 according to the user's request. Further, the controller 601 may move the location of the preset icon within the representative image. For example, if the user wants to move the icon, which is currently located at the top of the representative image, to the bottom of the representative image, the user may touch, drag, and release the icon at a location where the user desires. Then, the icon will remain at the dragged location.

Figure 9:
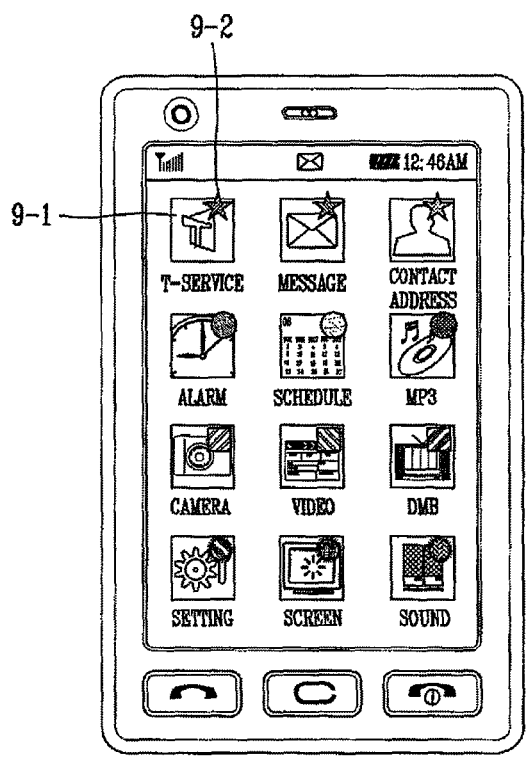
FIG. 9 illustrates a representative image and an icon of an application program according to a first embodiment of the present invention.

FIG. 9 illustrates a representative image and an icon of an application program according to a first embodiment of the present invention. As illustrated in FIG. 9, the controller 601 displays a preset icon (or sub-icon) 9-2 corresponding to a category of the application program at a specific position (for example, the upper right of the main icon, or the outside of the main icon) of the representative image (main icon) 9-1 of the application program. The preset icon 9-2 displayed on the representative image 9-1 may be various figures having various colors, or an outline outlining the outer boundary of the representative image 9-10. The outline may have various colors according to the category.

Furthermore, the controller 601 may display a yellow icon on the representative image of a sound-related application program, and display a blue icon on the representative image of a game-related application program, display an icon having a color mixed with yellow and blue on the representative image of a both sound and game-related application program. On the other hand, the controller 601 may display a category setting menu on the display unit 602 when an icon for setting a category is selected by the user.

Figure 10:
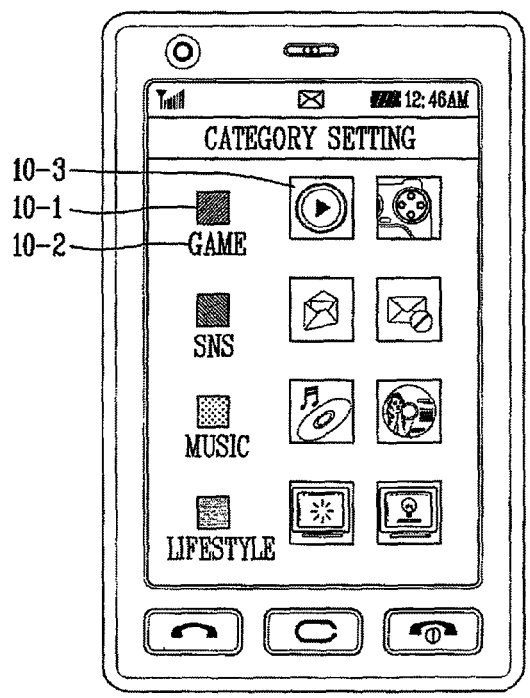
FIG. 10 illustrates a category setting menu according to a first embodiment of the present invention.

FIG. 10 illustrates a category setting menu according to a first embodiment of the present invention. As illustrated in FIG. 10, the controller 601 displays a category setting menu on the display unit 602 when the user selects an icon for setting a category. For example, when a preset icon 10-1 corresponding to the category is a rectangular-shaped icon with various colors, the controller 601 displays the icon on the category setting menu, and also displays a category name 10-2 for each preset icon 10-1. In other words, the controller 601 displays a text "game" for the category name near the blue icon, which indicates the game category, and displays a text "entertainment" near the red icon. Here, the color and shape of the icon 10-1 and the category name may be added or changed in a various manner according to a designer's or user's request.

In addition, the controller 601 may display the preset icon 10-1 and the category name 10-2 with a representative image 10-3 of the application program corresponding to the category name 10-2. Here, the controller 601 may display the representative images of the application programs in the order of the application program with the most execution number. The controller 601 executes an application program corresponding to the representative image 10-3 when the representative image 10-3 is selected by the user.

As a result, in a control content apparatus and method thereof according to a first embodiment of the present invention, an icon indicating a category of an application program or contents is displayed on or near a representative image of the application program, allowing the user to easily and quickly retrieve content such as an application program. Further, the application programs are automatically classified based on the category, and an icon indicating the category of each application program is displayed on or near a representative image of each application program, allowing the user to intuitively recognize the category of the application programs. Also, a category setting menu is displayed on the display unit when the user selects an icon for setting a category, allowing the user to easily change or add a preset icon and a category name corresponding to the category of each application program.

Figure 11:
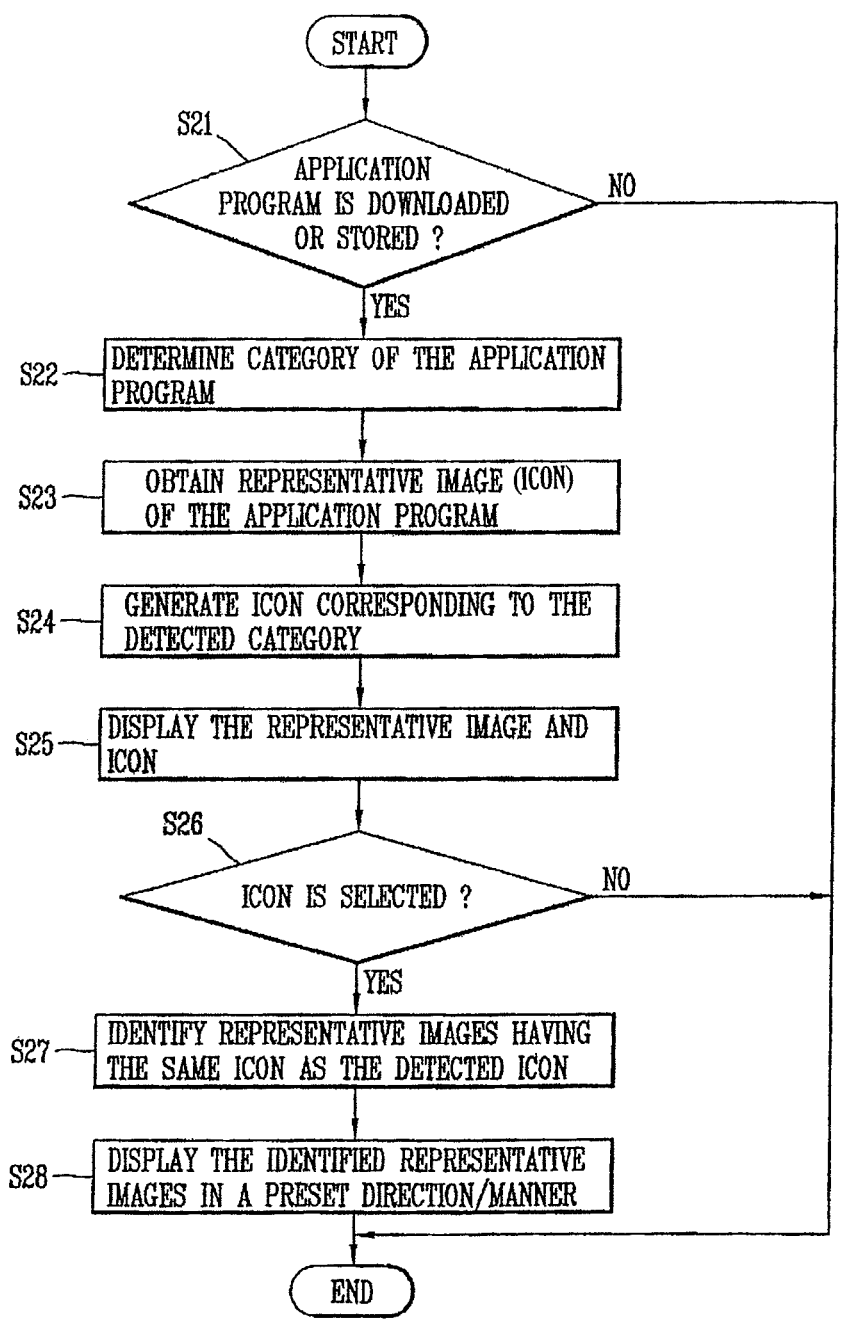
FIG. 11 is a flow chart illustrating a content control method according to a second embodiment of the present invention.

Hereinafter, a control content method according to a second embodiment of the present invention will be described with reference to FIGS. 11 through 13. FIG. 11 is a flow chart illustrating a content control method according to a second embodiment of the present invention.

First, the controller 601 determines whether or not the application program is downloaded or stored (S21), and determines a category of the application program from the application program when the application program is downloaded or stored (S22). For example, the controller 601 may determine category information, such as game, education, business, navigation, music, photo, etc., included in the attribute information of the application program, or determine a category of the application program based on an extension of the application program. Here, the attribute information of the application program includes category information. The controller 601 may download the application program from a server through a communication unit, and install the downloaded application program in the storage unit 603. On the other hand, when the controller determines that the category information is not included in the attribute information of the application program, the user may set the category information.

When the controller 601 determines that the application program is downloaded or stored, the controller 601 obtains a representative image of the application program from the application program (S23). For example, when any one application program is installed in the storage unit 603 among a variety of application programs, such as a game program, an entertainment program, various educational programs, a message management program, a calendar management program, a photo management program, a weather information providing program, and the like, the controller 601 obtains a representative image indicating the application program such as an icon from the any one application program.

Thereafter, the controller 601 generates a preset icon corresponding to the determined category of the application program (S24). For example, the controller 601 may generate a star-shaped figure when the category of the application program is a game category, generate a rectangular-shaped figure when the category of the application program is an education category, and generate a triangular-shaped figure when the category of the application program is a weather category. These figures are icons indicating different categories of the application programs, and the controller 601 generates an icon (for example, figure, symbol, color, etc.) indicating that the category of the application program is game when the category of the application program is game.

The controller 601 may further include a text corresponding to the category in the icon. For example, the controller 601 may further include a text in the icon indicating that the particular category of the application program is game. Here, the icon displayed according to the category may be changed in a various manner according to a designer's or user's request.

The controller 601 then displays a preset icon corresponding to a representative image of the application program and a category of the application program on the display unit 602 (S25). For example, the controller 601 displays a preset icon corresponding to a category of the application program at a specific position of the representative image of the application program. In particular, the controller 601 may display the preset icon at the upper right side of the representative image or at the outside of the representative image. Further, the controller may display the preset icon to be positioned within the representative image or to be partially overlapped with the representative image.

Next, the controller 601 determines whether or not the user selects an icon displayed on a representative image of the application program (S26). For example, the controller 601 determines whether or not an icon displayed on a representative image of the application program is selected by the user through a touch sensor 602-1. The touch sensor 602-1 may determine the user's selection by detecting a pressure of the touch and the touched position and area.

When an icon displayed on a representative image of the application program is selected by the user (YES, S26), the controller 601 identifies representative images having the same icon as the selected icon (S27). For example, when the user selects a star-shaped icon displayed on the representative image of the application program, the controller 601 identifies representative images having the star-shaped icon from the storage unit 603. Here, there may exist a plurality of application programs installed in the storage unit 603, and therefore, there may also exist a plurality of representative images and icons displayed on the representative images.

Once the controller 601 identifies the representative images having the same icon as the selected icon, controller 601 arranges the identified representative images in a preset direction, for example, horizontal or vertical direction, to display on the display unit 602 (S28). For example, if the identified representative images have a same category, they are arranged in the same direction and displayed on the display unit 602.

When a first icon of a first representative image is selected among the representative images arranged in the preset direction and displayed on the display unit 602, the controller 601 randomly displays the arranged and displayed representative images on the display unit 602. For example, when the user touches a particular preset icon displayed on a representative image of the game application program among the representative images arranged in a horizontal direction, the controller 601 randomly displays the arranged and displayed representative images on the display unit 602.

Figure 12:
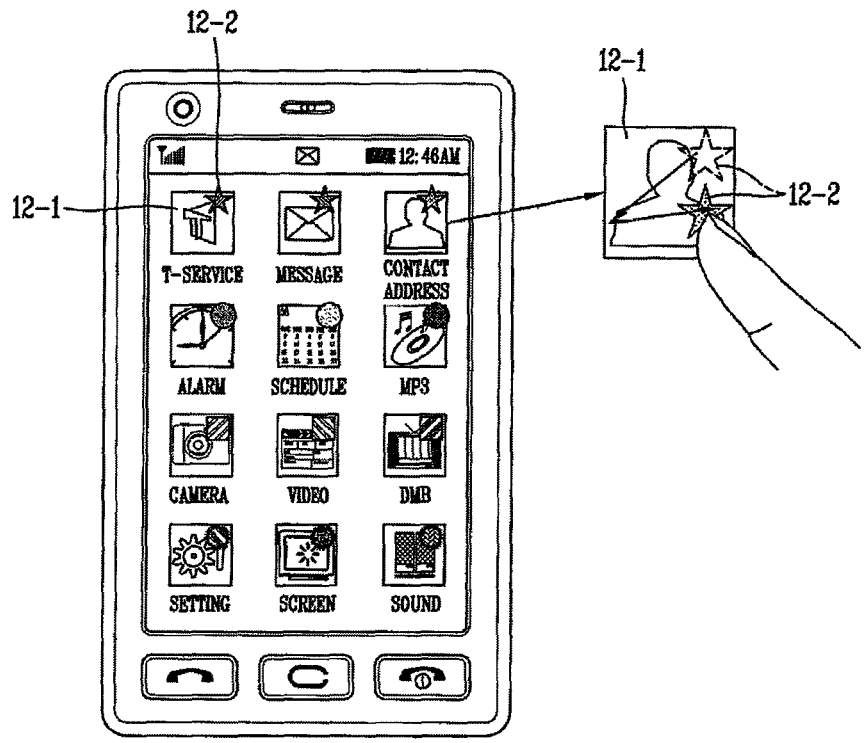
FIG. 12 illustrates representative images and icons arranged in a preset direction (horizontal or vertical direction) and displayed on the display unit according to a second embodiment of the present invention.

FIG. 12 illustrates representative images and icons arranged in a preset direction and displayed on the display unit according to a second embodiment of the present invention. As illustrated in FIG. 12, the controller 601 arranges the identified representative images 12-1 in a preset direction and displays on the display unit 602. The controller 601 displays an icon 12-2 on the representative image 12-1. Here, the preset direction may be horizontal or vertical direction.

Furthermore, when the user selects any one of the representative images 12-1 of a plurality of application programs, the controller 601 may identify representative images having the same icon, and arranges the identified representative images in a preset direction on the display unit 602. For example, when the user selects an icon indicating a game category, the controller 601 may arrange and display the representative images of the game application programs on a first region of the display unit 602. Further, the controller 601 may arrange and display the representative images of the education application programs on a second region of the display unit 602, and arrange and display the representative images of the weather application programs on a third region of the display unit 602.

On the other hand, the controller 601 may determine whether or not the user makes a shaking movement to any one of the icons 12-2 displayed on the representative images 12-1 of the plurality of application programs through the touch sensor 602-1 with a preset number. Then, the controller 601 may identify representative images having the same icon with the icon 12-2, and arrange the identified representative images in a preset direction to display on the display unit 602 when, for example, the user touches one of the icons 12-2 and makes one back-and-forth movement horizontally within the corresponding representative image 12-1. Further, the controller 601 may also randomly arrange and display the representative images that are already arranged on the display unit 602, when the user makes a shaking movement to the any one icon already arranged on the display unit 602 with a preset number that is different from the preset number to arrange the identified representative image. Here, the technology for detecting a shaking movement through the touch sensor 602-1 is a publicly-known technology, and thus the detailed description thereof will be omitted.

Figure 13:
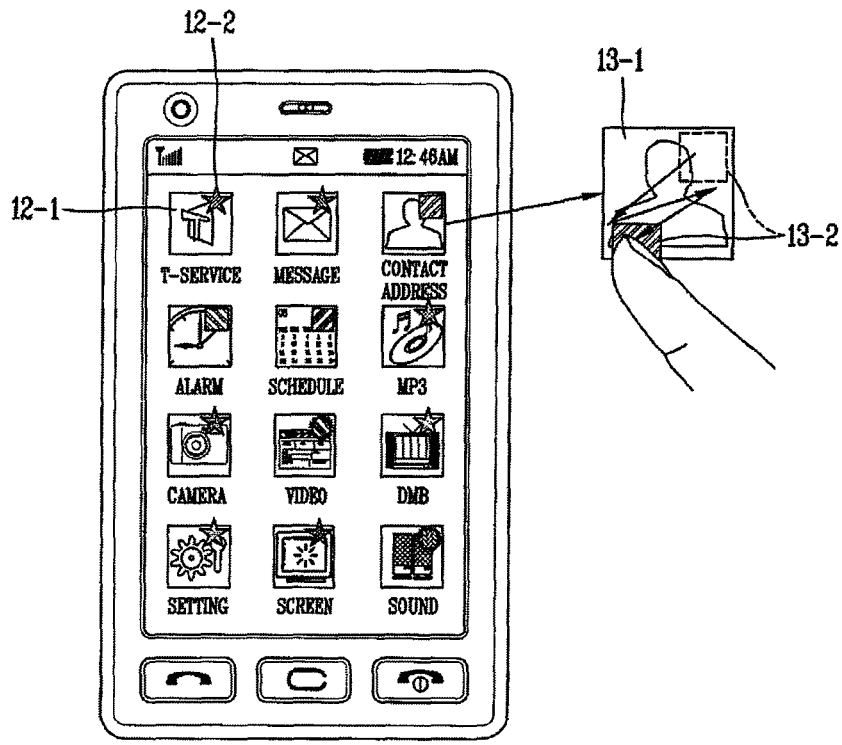
FIG. 13 illustrates representative images and icons randomly displayed according to a second embodiment of the present invention.

FIG. 13 illustrates representative images and icons randomly displayed according to a second embodiment of the present invention. As illustrated in FIG. 13, when the user selects a first icon of a first representative image among the representative images 13-1 arranged in the preset direction, the controller 601 randomly displays the arranged and displayed representative images on the display unit 602.

The controller 601 displays an icon 13-2 on the representative image 13-1. For example, when the user touches an icon displayed on a representative image of the game application program among the representative images 13-1 arranged in a horizontal direction on the display unit 602, the controller 601 randomly displays the arranged and displayed representative images on the display unit 602. The controller 601 may also display the generated icon 13-2 on the representative image 13-1, and display information of the application program on the display unit 602 when the icon 13-2 is selected.

Figure 14:
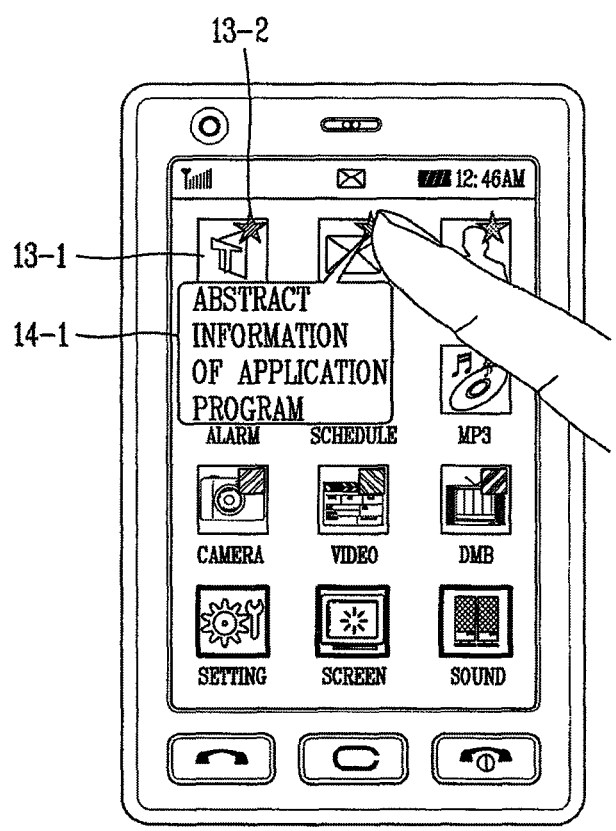
FIG. 14 illustrates information of an application program according to a second embodiment of the present invention.

FIG. 14 illustrates information of an application program according to a second embodiment of the present invention. As illustrated in FIG. 14, the controller 601 may display the generated icon 13-2 on the representative image 13-1, and may also display information 14-1 of the application program when the icon 13-2 is selected. For example, when the application program of the representative image 13-1 including the icon 13-2 is a game program, and the icon 13-2 is an icon indicating a game, the controller 601 may display the game information of the game program on the display unit 602, as shown in FIG. 14.

As a result, in a control content apparatus and method thereof according to a second embodiment of the present invention, when the user selects an icon displayed on a representative image of the application program, representative images having the same icon as the selected icon may be arranged in a same direction on the display unit 602, allowing the user to intuitively recognize the same application programs.

Figure 15:
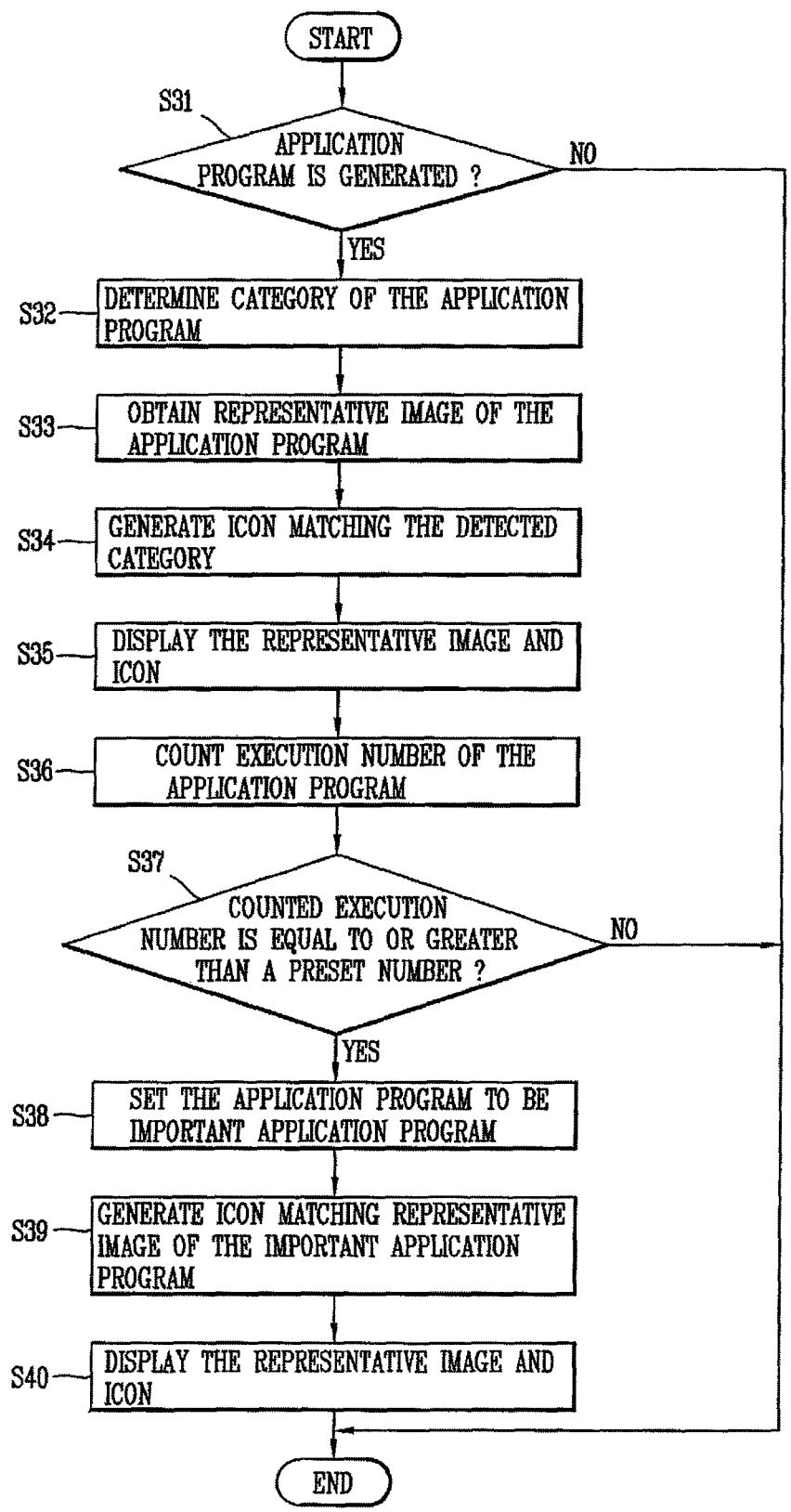
FIG. 15 is a flow chart illustrating a content control method according to a third embodiment of the present invention.

Hereinafter, a control content method according to a third embodiment of the present invention will be described with reference to FIGS. 15, and 16. FIG. 15 is a flow chart illustrating a content control method according to a third embodiment of the present invention.

First, the controller 601 determines whether or not the application program is downloaded or stored (S31), and determines a category of the application program from the application program when the application program is downloaded or stored (S32). For example, the controller 601 may determine category information, such as game, education, business, navigation, music, photo, etc., included in the attribute information of the application program, or determine a category of the application program based on an extension of the application program. Here, the attribute information of the application program includes category information. The controller 601 may download the application program from a server through a communication unit, and install the downloaded application program in the storage unit 603.

When the controller 601 determines that the application program is generated, the controller 601 obtains a representative image of the application program from the application program (S33). For example, when any one application program is installed in the storage unit 603 among a variety of application programs, such as a game program, an entertainment program, various educational programs, a message management program, a calendar management program, a photo management program, a weather information providing program, and the like, the controller 601 obtains a representative image indicating the application program such as an icon from the any one application program.

Thereafter, the controller 601 generates a preset icon corresponding to the determined category of the application program (S34). For example, the controller 601 may generate a star-shaped figure when the category of the application program is a game category, generate a rectangular-shaped figure when the category of the application program is an education category, and generate a triangular-shaped figure when the category of the application program is a weather category. These figures are icons indicating different categories of the application programs.

The controller 601 then displays a preset icon corresponding to a representative image of the application program and a category of the application program on the display unit 602 (S35). For example, the controller 601 displays a preset icon corresponding to a category of the application program at a specific position (for example, the upper right of the representative image, or the outside of the representative image) of the representative image of the application program.

Next, the controller 601 counts the execution number of the application program (S36). For example, the controller 601 counts each time the application program is executed, and stores the counted value in the storage unit 603. Further, the controller 601 determines whether or not the execution number of the application program is equal to or greater than a preset number (for example, 5-10 times) (S37). When the execution number of the application program is equal to or greater than a preset number (YES, S37), the controller 601 sets the application program as a preferred application program (S38).

Then, the controller 601 generates an icon corresponding to a representative image of the preferred application program, and displays the generated icon and the representative image on the display unit 602. Here, the controller 601 displays the icon on or near the representative image of the preferred application program, and stores the representative image including the icon in the storage unit 603. When the user selects a key for checking the preferred application program, the controller 601 may display the representative image of the preferred application program together with a preset icon corresponding to the representative image on the display unit 602.

Figure 16:
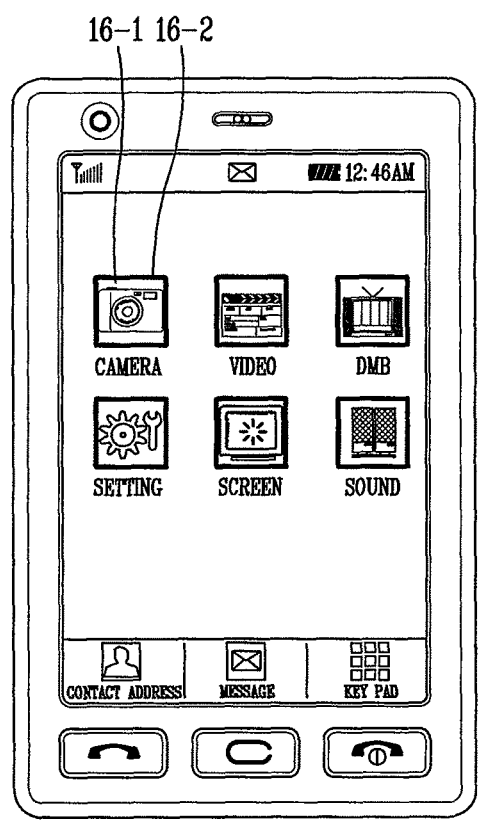
FIG. 16 illustrates a representative image of a preferred application program and a preset icon corresponding to the representative image according to a third embodiment of the present invention.

FIG. 16 illustrates a representative image of a preferred application program and a preset icon corresponding to the representative image according to a third embodiment of the present invention.

As illustrated in FIG. 16, when the user selects a key for checking the preferred application program, the controller 601 displays the representative image 16-1 of the preferred application program together with a preset icon 16-2 corresponding to the representative image 16-1 on the display unit 602. Here, the preset icon 16-2 corresponding to the representative image 16-1 may be an outline 16-2 displayed on the outer boundary of the representative image 16-1, and may be changed in various manners according to a designer's or user's request.

As a result, in a control content apparatus and method thereof according to a third embodiment of the present invention, a preferred application program is automatically configured based on the execution number of the application program, allowing the user to quickly and easily recognize a preferred application program.

Figure 17:
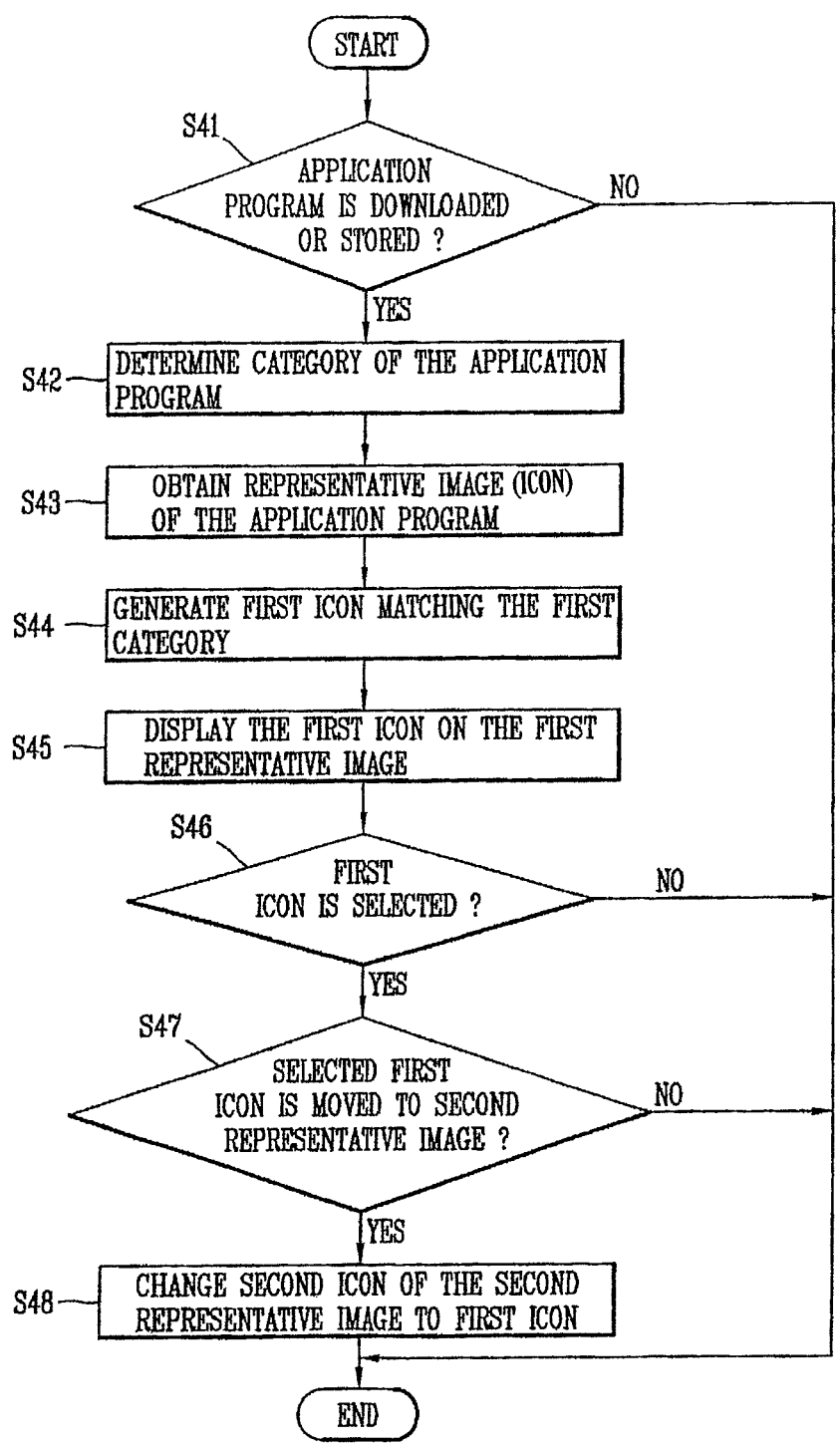
FIG. 17 is a flow chart illustrating a content control method according to a fourth embodiment of the present invention.

Hereinafter, a control content method according to a fourth embodiment of the present invention will be described with reference to FIGS. 17 through 19. FIG. 17 is a flow chart illustrating a content control method according to a fourth embodiment of the present invention.

First, the controller 601 determines whether or not a first application program is downloaded and stored (S41), and determines a category of the first application program from the first application program when the first application program is downloaded and stored (S42). For example, the controller 601 may determine category information included in the attribute information of the first application program, or determine a category of the first application program based on an extension of the first application program. The controller 601 may download the first application program from a server through a communication unit, and install the downloaded first application program in the storage unit 603.

When the first application program is generated, the controller 601 identifies a first representative image (for example, an icon indicating the application program) of the first application program from the first application program (S43). For example, when any one application program is installed in the storage unit 603 among a variety of application programs, such as a game program, an entertainment program, various educational programs, a message management program, a calendar management program, a photo management program, a weather information providing program, and the like, the controller 601 identifies a representative image indicating the application program such as an icon from the any one application program.

Thereafter, the controller 601 generates a preset first icon corresponding to the determined category of the first application program (S44). For example, the controller 601 may generate a star-shaped figure when the category of the first application program is a game category, generate a rectangular-shaped figure when the category of the first application program is an education category, and generate a triangular-shaped figure when the category of the first application program is a weather category. These figures are icons indicating different categories of the application programs. Here, the icon according to the category may be changed in a various manner as described above a designer's or user's request.

The controller 601 then displays a preset first icon corresponding to the category of the first application program on the first representative image of the first application program (S45). For example, the controller 601 displays a preset icon corresponding to a category of the application program at a specific position (of the representative image of the application program. Here, the specific position may be the upper right of the representative image, or the outside of the representative image.

Next, the controller 601 determines whether or not the user selects the first icon (S46). When the controller 601 determines that the user selected the first icon (YES, S46), the controller further determines whether or not the user drags the first icon to move it to a second representative image (S47). Here, the second representative image is a representative image of a second application program (which is different from the first application program, and the second representative image may include or not include an icon indicating a category of the second application program.

Once the controller 601 determines that the user dragged and moved the first icon to a second representative image, the controller 601 changes a second icon of the second representative image to the first icon (S48). For example, when the user drags the first icon indicating a game to a second representative image indicating an education application program, the controller 601 changes a second icon indicating education of the second representative image to the first icon indicating a game. On the contrary, when the second representative image indicating the education application program with no category information, the controller 601 displays the first icon on the second representative image when the user drags and moves the first icon indicating a game to the second representative image.

Figure 18:
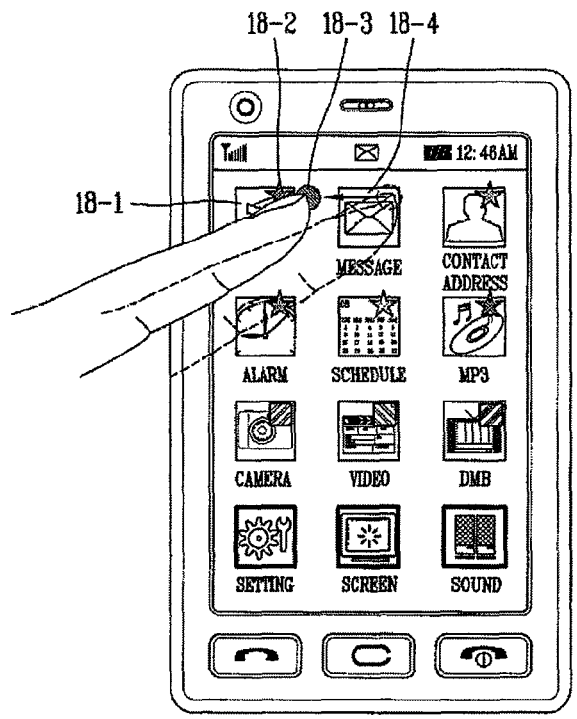
FIG. 18 illustrates an icon according to a fourth embodiment of the present invention.

FIG. 18 illustrates an icon according to a fourth embodiment of the present invention. As illustrated in FIG. 18, when the user drags and moves the first icon 18-3 displayed on a representative image 18-4 indicating a first application program to a second representative image 18-1, the controller 601 changes a second icon 18-2 of the second representative image 18-1 to the first icon 18-2. For example, when the user drags and moves the first icon 18-3 indicating a game to a second representative image 18-1 indicating an education application program, the controller 601 changes a second icon 18-2 indicating education of the second representative image 18-1 to the first icon 18-3.

On the other hand, when the first icon 18-3 indicating a game is dragged by the user to be moved to a second representative image 18-1 indicating an education application program, the controller 601 may display a pop-up window (or menu) for setting an icon on the display unit 602.

Figure 19:
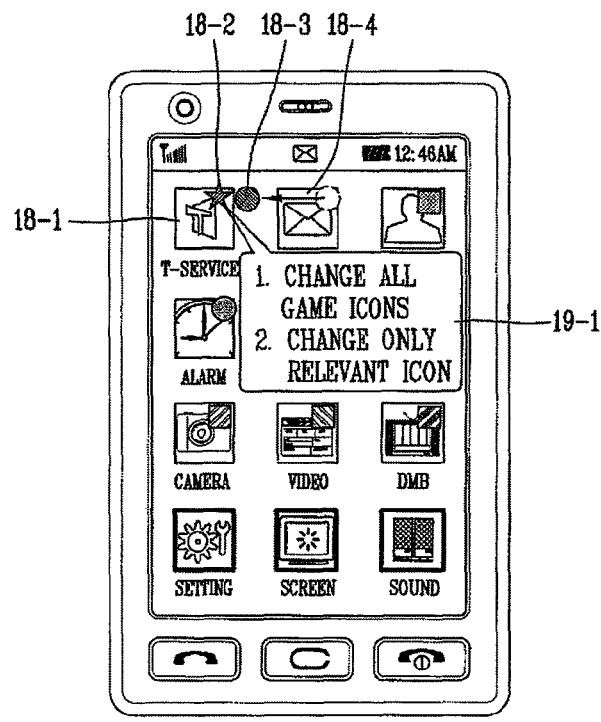
FIG. 19 illustrates a pop-up window for setting an icon according to a fourth embodiment of the present invention.

FIG. 19 illustrates a pop-up window for setting an icon according to a fourth embodiment of the present invention. As illustrated in FIG. 19, when the user drags the first icon 18-4 to move it to a second representative image 18-1 indicating an education application program, the controller 601 displays a pop-up window or menu 19-1 inquiring whether or not the controller 601 should replace all the second icon 18-2 for all the representative images indicating education application programs with the first icon 18-4 or display the first icon 18-4 only on the second representative image 18-1, to which the first icon 18-4 is dragged. At this time, according to the user's selection, the controller 601 changes the icons displayed on all the representative images indicating education application programs to the first icon 18-4, or displays the first icon 18-4 only on the second representative image 18-1.

As a result, in a control content apparatus and method thereof according to a fourth embodiment of the present invention, when the user moves an icon displayed on a first representative image to a second representative image different from the first representative image, the moved icon may become the icon indicating a category of the application programs that are in the same category as the second representative image, or may change the icon indicating a category of the application program only for the second representative image, allowing the user to easily and quickly configure an icon indicating a category of the application program.

Figure 20:
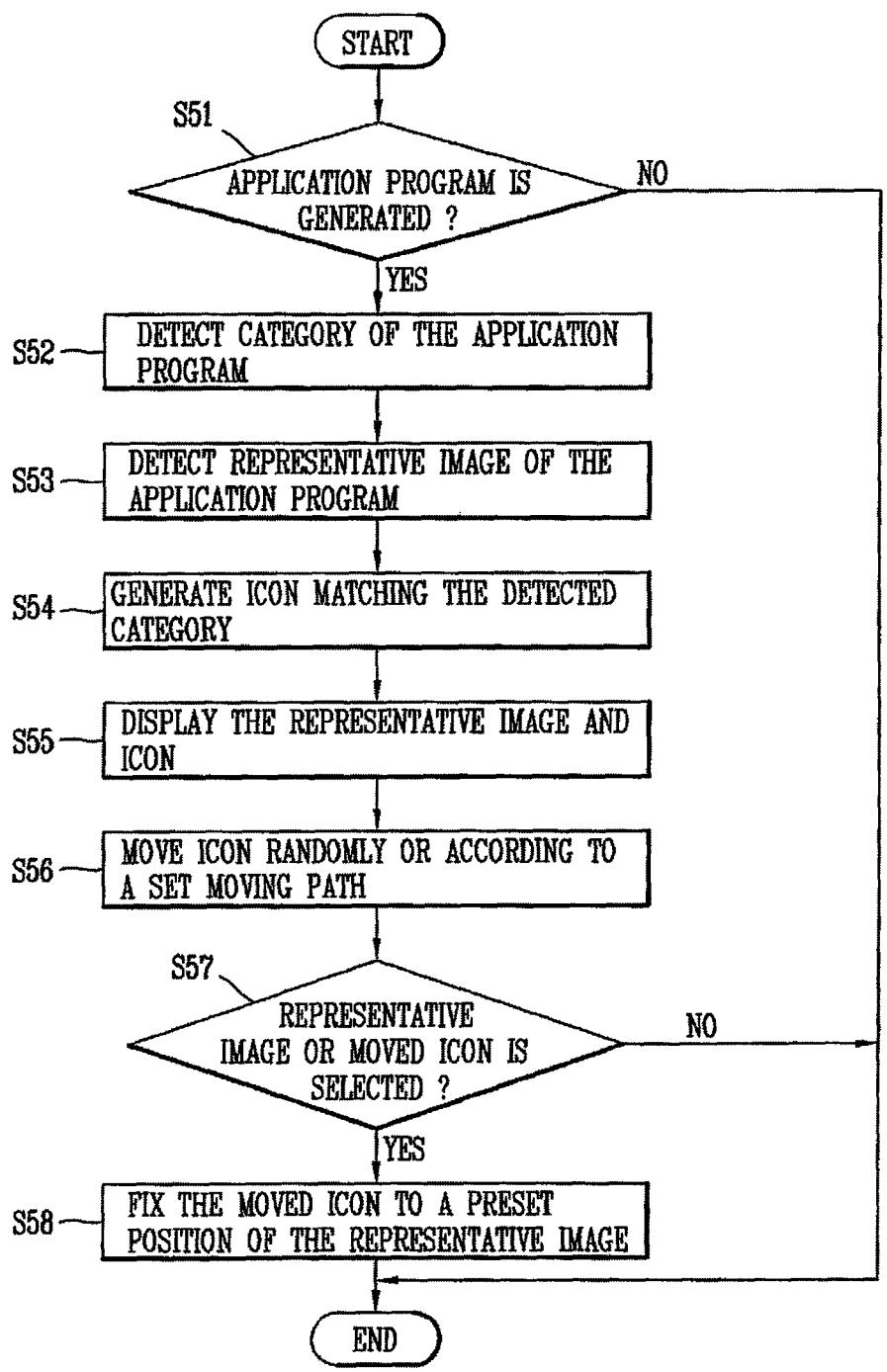
FIG. 20 is a flow chart illustrating a content control method according to a fifth embodiment of the present invention.

Hereinafter, a control content method according to a fifth embodiment of the present invention will be described with reference to FIGS. 20, and 21. FIG. 20 is a flow chart illustrating a content control method according to a fifth embodiment of the present invention.

First, the controller 601 determines whether or not a new application program is downloaded or stored (S51), and determines a category of the new application program from the new application program when the new application program is downloaded or stored (S52). For example, the controller 601 may determine category information included in the attribute information of the new application program, or determine a category of the new application program based on an extension of the new application program. The controller 601 may download the new application program from a server through a communication unit, and install the downloaded new application program in the storage unit 603.

When the controller 601 determines that the new application program is downloaded or stored, the controller 601 obtains a representative image, of the new application program from the new application program (S53). For example, when any one application program is installed in the storage unit 603 among a variety of application programs, such as a game program, an entertainment program, various educational programs, a message management program, a calendar management program, a photo management program, a weather information providing program, and the like, the controller 601 obtains a representative image indicating the application program such as an icon from the any one application program.

Next, the controller 601 generates a preset icon corresponding to the determined category of the new application program (S54). For example, the controller 601 may generate a star-shaped figure when the category of the new application program is a game category, generate a rectangular-shaped figure when the category of the new application program is an education category, and generate a triangular-shaped figure when the category of the new application program is a weather category. These figures are icons indicating different categories of the application programs. Here, the icon according to the category may be changed in various manners as described above according to a designer's or user's request.

The controller 601 then displays a preset icon corresponding to the category of the new application program on the representative image of the new application program (S55). At this time, the controller 601 randomly moves the icon or consecutively moves along a preset path within the representative image of the new application program (S56). For example, the controller 601 generates a moving icon on a representative image of an initially installed application program to allow the user to easily find the newly generated application program.

Next, the controller 601 determines whether or not the user selects a representative image of the new application program or an icon moved within the representative image (S57). When the controller 601 determines that the user selected a representative image of the new application program or an icon moved within the representative image (YES, S57), the controller 601 fixes the icon to a preset position on the representative image (S58). For example, if a specific position of the selected preset icon corresponding to a category of the new application program of the representative image of the new application program is the upper right of the representative image, the controller may place the preset icon at the specific location.

Figure 21:
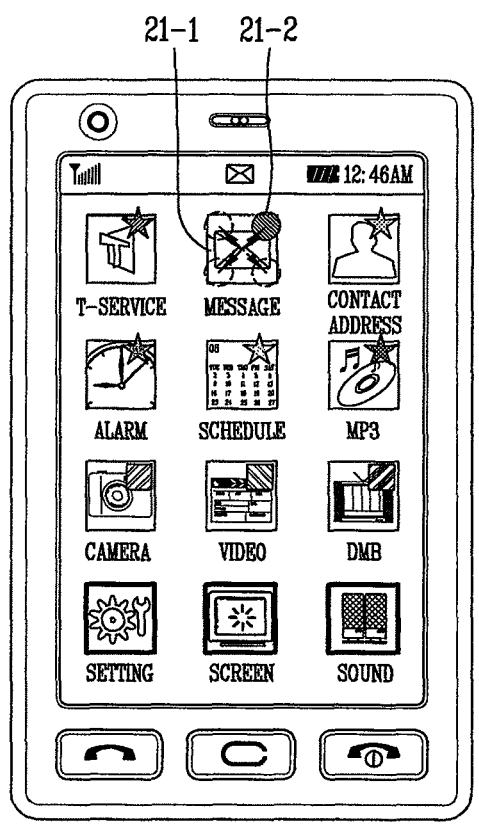
FIG. 21 illustrates a moving icon according to a fifth embodiment of the present invention.

FIG. 21 illustrates a moving icon according to a fifth embodiment of the present invention. As illustrated in FIG. 21, the controller 601 randomly moves an icon 21-2 indicating a category of the new application program or consecutively moves along a preset trace within a representative image 21-1 of the new application program. In other words, the controller 601 generates a moving icon 21-2 on a representative image 21-1 of an initially installed application program to allow the user to easily find the newly installed application program.

As a result, in a control content apparatus and method thereof according to a fifth embodiment of the present invention, a moving icon is generated on a representative image of an newly installed application program, allowing the user to easily and quickly find the initially generated application program.

Figure 22:
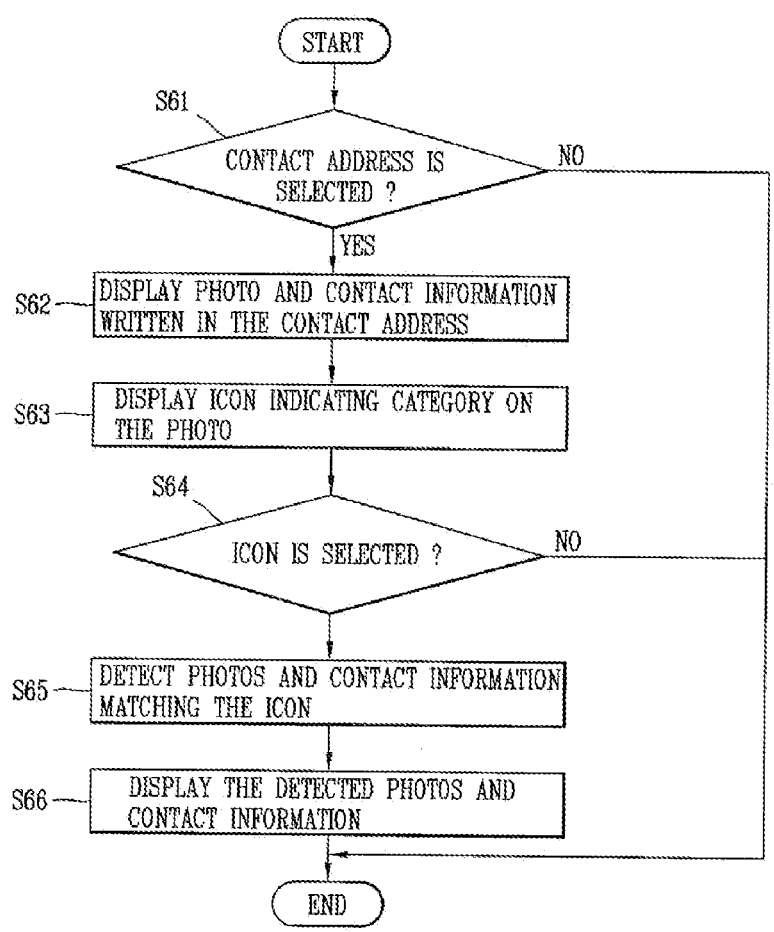
FIG. 22 is a flow chart illustrating a content control method according to a sixth embodiment of the present invention.

Hereinafter, a control content method according to a sixth embodiment of the present invention will be described with reference to FIGS. 22, and 23. FIG. 22 is a flow chart illustrating a content control method according to a sixth embodiment of the present invention.

First, the controller 601 determines whether or not the user selects a contact address icon displayed on the display unit 602 (S61). When the user selects the contact address icon (YES, S61), the controller 601 displays a photo and/or contact information written in a contact address (for example, a telephone book) on the display unit 602 (S62). Here, the contact information may include telephone numbers and names based on a category, such as family, friend, company, customer, etc. Further, the photo written in the contact address may be a thumbnail image of a figure photo or a counterpart figure photo corresponding to the telephone number and/or name written in the contact address. Moreover, the contact address is stored in the storage unit 603.

Next, the controller 601 displays an icon indicating the category on the photo and/or contact information (counterpart contact information) written in the contact address (S63). For example, the controller 601 displays a star-shaped icon indicating a family when the user includes a first photo and/or a first contact information written in the contact address in a family category, displays a rectangular-shaped icon indicating a friend when the user includes a second photo and/or a second contact information written in the contact address in a friend category, displays a circular-shaped icon indicating a company when the user includes a third photo and/or a third contact information written in the contact address in a company category, and displays a triangular-shaped icon indicating a customer when the user includes a fourth photo and/or a fourth contact information written in the contact address in a customer category. Here, the shape and color of the icon may be changed or added by the designer or user.

The controller 601 then determines whether or not the user selects one of the icons (S64). When the user selects one icon (YES S64), the controller 601 obtains photos and/or contact information corresponding to the selected icon from the storage unit 603 (S65). For example, the controller 601 obtains photos and/or contact information belonging to a family category from the storage unit 603 when an icon indicating the family category is selected by the user, and obtains photos and/or contact information belonging to a friend category from the storage unit 603 when an icon indicating the friend category is selected by the user, and obtains photos and/or contact information belonging to a company category from the storage unit 603 when an icon indicating the company category is selected by the user, and obtains photos and/or contact information belonging to a customer category from the storage unit 603 when an icon indicating the customer category is selected by the user.

Finally, the controller 601 displays the obtained photo and/or contact information on the display unit 602 (S66).

Figure 23:
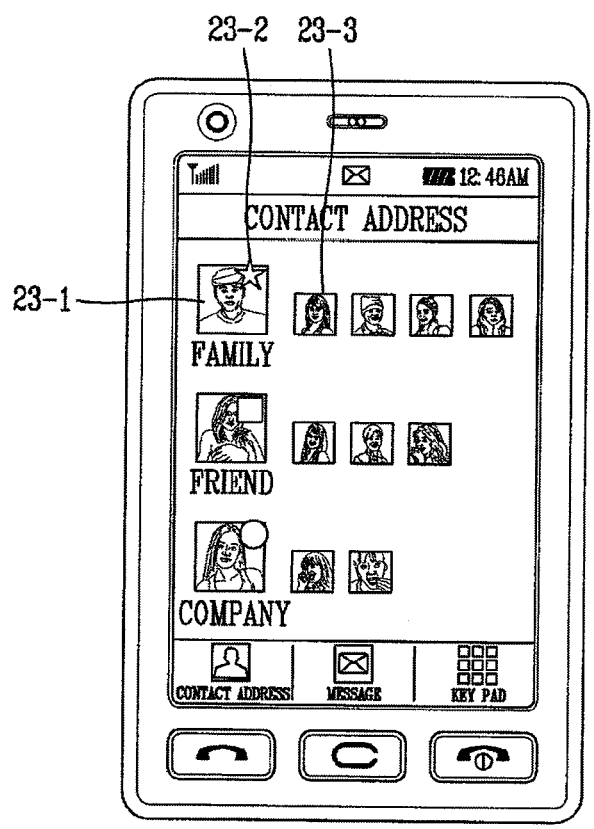
FIG. 23 illustrates photos and/or contact information displayed on the display unit according to a sixth embodiment of the present invention.

FIG. 23 illustrates photos and/or contact information displayed on the display unit according to a sixth embodiment of the present invention. As illustrated in FIG. 23, the controller 601 displays photos and contact information 23-3 belonging to a family category on the display unit 602 when an "icon 23-2 indicating a family category" displayed on a specific family photo 23-1 (for example, a brother's photo) is selected by the user, and displays photos and contact information 23-3 belonging to a friend category on the display unit 602 when an icon indicating a friend category is selected by the user, and displays photos and contact information 23-3 belonging to a company category on the display unit 602 when an icon indicating a company category is selected by the user, and displays photos and contact information 23-3 belonging to a customer category on the display unit 602 when an icon indicating a customer category is selected by the user.

As a result, in a control content apparatus and method thereof according to a sixth embodiment of the present invention, an icon indicating the category is displayed on each contact address, and contact addresses (photos and/or contact information) corresponding to the selected icon are displayed on the display unit when the icon is selected, thereby allowing the user to quickly and easily retrieve and select the relevant contact addresses.

As described above, in a control content apparatus and method thereof according to embodiments of the present invention, an icon indicating the category of an application program (content) is displayed on a representative image of the application program, thereby allowing the user to easily and quickly retrieve content such as an application program.

In a control content apparatus and method thereof according to embodiments of the present invention, application programs (contents) are automatically classified, and an icon indicating the category of each application program is displayed on a representative image of each application program, thereby allowing the user to intuitively recognize the category of the application programs.

In a control content apparatus and method thereof according to embodiments of the present invention, a category setting menu is displayed on the display unit when an icon for setting a category is selected by the user, thereby allowing the user to easily change or add a preset icon and a category name corresponding to the category of each application program.

In a control content apparatus and method thereof according to embodiments of the present invention, when an icon displayed on a representative image of the application program is selected by the user, representative images having the same icon as the selected icon are arranged in a same direction and displayed on the display unit, thereby allowing the user to intuitively recognize the same application programs.

In a control content apparatus and method thereof according to embodiments of the present invention, a preferred application program is automatically configured based on the execution number of the application program, thereby allowing the user to quickly and easily recognize a preferred application program.

In a control content apparatus and method thereof according to embodiments of the present invention, when an icon displayed on the representative image is moved to a representative image different from the representative image, the moved icon is displayed as an icon indicating a category of the application program corresponding to the different representative image, or the icon indicating a category of the application program corresponding to the different representative image is changed to the moved icon, thereby allowing the user to easily and quickly configure an icon indicating a category of the application program.

In a control content apparatus and method thereof according to embodiments of the present invention, a moving icon is generated on a representative image of an initially-installed application program (new application program), thereby allowing the user to easily and quickly find the initially generated application program.

In a control content apparatus and method thereof according to embodiments of the present invention, an icon indicating the category is displayed on each contact address, and contact addresses (photos and/or contact information) corresponding to the selected icon are displayed on the display unit when the icon is selected, thereby allowing the user to quickly and easily retrieve and select the relevant contact addresses.

It will be apparent to those skilled in this art that various changes and modifications may be made thereto without departing from the gist of the present invention. Accordingly, it should be noted that the embodiments disclosed in the present invention are only illustrative and not limitative to the spirit of the present invention, and the scope of the spirit of the invention is not limited by those embodiments. The scope protected by the present invention should be construed by the accompanying claims, and all the spirit within the equivalent scope of the invention should be construed to be included in the scope of the right of the present invention.

What is claimed is:

1. A mobile terminal comprising:
a controller configured to determine a category of an application program and an image representing the application program, and to determine an icon corresponding to the determined category of the application program; and
a display unit including a screen, and configured to simultaneously display the image representing the application program and the icon corresponding to the determined category of the application program on the screen,
wherein the controller displays the icon corresponding to the determined category of the application on at least a part of the image representing the application program, and
wherein based on a selection of the icon displayed on the image, the controller identifies at least one other image having the same icon as the selected icon, and displays the image associated with the selected icon and the identified at least one other image arranged in a preset direction on the display unit.

2. The mobile terminal of claim 1, wherein the icon is an image previously designated to correspond to the category of the application program or an image selected by a user.

3. The mobile terminal of claim 1, wherein the icon indicates the determined category of the application program.

4. The mobile terminal of claim 3, wherein the icon further comprises a text associated with the determined category of the application program.

5. The mobile terminal of claim 1, wherein the icon corresponding to the determined category of the application is at least one of the following: a figure, a symbol, a figure having a color, an outline of the image, an outline of the image and having a color, and a translucent color to be overlapped at least in part with the image.

6. The mobile terminal of claim 1, wherein the controller places the icon corresponding to the determined category of the application program at an outer area of the image representing the application program.

7. The mobile terminal of claim 1, wherein when the application program belongs to a plurality of different categories, the controller displays a plurality of different icons corresponding respectively to the plurality of different categories on or near the image representing the application program.

8. The mobile terminal of claim 1, wherein when the mobile terminal is moved while the icon displayed on the image is selected, the controller displays the image associated with the selected icon and the identified at least one other image in the preset direction.

9. The mobile terminal of claim 1, wherein when one of the images arranged in the preset direction on the display unit is selected, the controller re-displays the arranged images in a random order on the display unit.

10. The mobile terminal of claim 1, wherein the controller counts an execution number of the application program, and sets the application program to a preferred application program when the counted execution number is equal to or greater than a preset number.

11. The mobile terminal of claim 10, wherein the controller determines an icon corresponding to the preferred application program, and displays the icon corresponding to the preferred application program together with an image representing the preferred application program on the display unit.

12. The mobile terminal of claim 1, wherein the controller determines the category of the application program based on category information included in attribute information of the application program or based on extension information of the application program.

13. The mobile terminal of claim 1, wherein the controller displays a category setting menu on the display unit when an icon for setting a category is selected, and the category setting menu includes icons and category names according to the category.

14. The mobile terminal of claim 1, wherein the controller displays the icon on the image representing the application program, and displays additional information of the application program on the display unit when the displayed icon is selected.

15. The mobile terminal of claim 1, wherein the controller moves the icon from a current location to a new location over the image representing the program application according to a user input.

16. A mobile terminal comprising:
a controller configured to determine a category of an application program and an image representing the application program, and to determine an icon corresponding to the determined category of the application program; and
a display unit including a screen, and configured to simultaneously display the image representing the application program and the icon corresponding to the determined category of the application program on the screen, wherein the controller displays the icon corresponding to the determined category of the application on at least a part of the image representing the application program, and wherein when the icon displayed on the image is moved towards an image representing a different application program, the controller displays the moved icon as an icon representing the different application program.

17. A mobile terminal comprising:

a controller configured to determine a category of an application program and an image representing the application program, and to determine an icon corresponding to the determined category of the application program; and a display unit including a screen, and configured to simultaneously display the image representing the application program and the icon corresponding to the determined category of the application program on the screen, wherein the controller displays the icon corresponding to the determined category of the application on at least a part of the image representing the application program, and wherein when the icon displayed on the image is moved towards an image representing a different application program, the controller displays a menu for setting the moved icon on the display unit.

18. The mobile terminal of claim 1, wherein the controller randomly moves the icon or moves along a preset path repeatedly.

19. The mobile terminal of claim 1, wherein the controller further determines an icon corresponding to a category of a contact address, and displays simultaneously the determined icon and a photo corresponding to the contact address on the screen.

20. The mobile terminal of claim 19, wherein when the icon corresponding to the category of the contact address is selected, the controller displays at least one other contact address that has the same icon as the selected icon.

21. A method for controlling a display unit of a mobile terminal, the method comprising:

determining, by the mobile terminal, a category of an application program and an image representing the application program;

determining, by the mobile terminal, an icon corresponding to the determined category of the application program; and displaying simultaneously, on a screen of the display unit, the image representing the application program and the icon corresponding to the determined category of the application program, wherein the displaying step displays the icon corresponding to the determined category of the application on at least a part of the image representing the application program, and wherein based on a selection of the icon displayed on the image, the method further comprises identifying at least one other image having the same icon as the selected icon, and displaying the image associated with the selected icon and the identified at least one other image arranged in a preset direction on the display unit.

22. A mobile terminal, comprising:

a wireless communication unit configured to wirelessly communicate with at least one other terminal;

a display unit configured to display a plurality of icons representing different applications that can be executed on the mobile terminal, and to display text below the icons indicating names of the applications; and a controller configured to:

receive an input request for setting a category of at least a first application among the different applications, create the category for the first application based on the received input request, link the first application with the created category, display a categorical image on the display unit indicating the category including the linked first application, display an icon representing the first application simultaneously with the categorical image, and display text below the categorical image indicating a user-created name of the category.

23. The mobile terminal of claim 22, wherein when the icon representing the first application is displayed simultaneously with the categorical image, text of the icon representing the first application and indicating a name of the first application is no longer displayed below the icon as before the input request was received.

24. The mobile terminal of claim 22, wherein text of the icon representing the first application is only displayed below the icon representing the first application before the input request is received.

25. The mobile terminal of claim 22, wherein the categorical image includes at least a rectangular shape.

26. The mobile terminal of claim 22, wherein the controller is further configured to execute the first application when the icon representing the first application is selected.

* * * * *